United States Patent [19]

Altermatt

[11] Patent Number: 5,550,218

[45] Date of Patent: Aug. 27, 1996

[54] AZO COMPOUNDS HAVING UNSUBSTITUTED OR SUBSTITUTED 2-PHENOXYCARBONYLETHYL GROUPS

[75] Inventor: Ruedi Altermatt, Buckten, Switzerland

[73] Assignee: Sandoz Ltd., Basel, Switzerland

[21] Appl. No.: 319,834

[22] Filed: Oct. 6, 1994

Related U.S. Application Data

[63] Continuation of Ser. No. 6,018, Jan. 15, 1993, abandoned, which is a continuation-in-part of Ser. No. 728,431, Jul. 11, 1991, abandoned.

[30] Foreign Application Priority Data

Jul. 11, 1990 [DE] Germany .................. 40 22 092.3
Mar. 13, 1991 [DE] Germany .................. 41 08 087.4

[51] Int. Cl.$^6$ ............ C09B 29/085; C09B 29/36; C09B 31/043; C09B 29/46; C09B 67/22; D06P 1/18
[52] U.S. Cl. ............ 534/852; 534/751; 534/756; 534/788; 534/795; 534/831; 534/850; 534/854; 534/856; 534/857; 534/735; 534/573
[58] Field of Search ............ 534/751, 756, 534/788, 831, 850, 795, 852, 854, 856, 857

[56] References Cited

U.S. PATENT DOCUMENTS

| | | | |
|---|---|---|---|
| 2,373,700 | 4/1945 | McNally et al. | 260/205 |
| 3,732,201 | 5/1973 | Ramanathan | 534/788 |
| 4,097,475 | 6/1978 | James | 260/157 |
| 4,101,541 | 7/1978 | Petitpierre et al. | 534/788 |
| 4,160,764 | 7/1979 | Mischke et al. | 534/850 |
| 4,210,586 | 7/1980 | Clark et al. | 534/852 |
| 4,313,872 | 2/1982 | Heimrich et al. | 534/581 |
| 4,542,207 | 9/1985 | Niwa et al. | 534/630 |

FOREIGN PATENT DOCUMENTS

| | | |
|---|---|---|
| 197471 | 10/1986 | European Pat. Off. |
| 3226761 | 1/1984 | Germany ............ 534/788 |
| 47-49161 | 12/1972 | Japan . |
| 50-70674 | 6/1975 | Japan ............ 534/788 |
| 50-69381 | 6/1975 | Japan ............ 534/788 |
| 57-109859 | 7/1982 | Japan . |
| 58-38754 | 3/1983 | Japan ............ 534/852 |
| 1061268 | 3/1967 | United Kingdom ...... 534/788 |
| 1298765 | 12/1972 | United Kingdom ...... 534/788 |
| 1461738 | 1/1977 | United Kingdom . |
| 2104909 | 3/1983 | United Kingdom ...... 534/852 |

*Primary Examiner*—Floyd D. Higel
*Attorney, Agent, or Firm*—Robert S. Honor; Melvyn M. Kassenoff

[57] ABSTRACT

Compounds of the formula

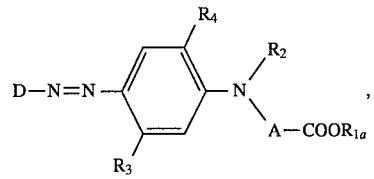

wherein

A is $C_{1-6}$ alkylene, D is a diazo component radical of the triazolyl, pyrazolyl, cyano($C_{1-4}$alkyl)-imidazolyl, 4-chlorothiazolyl, 4-chlorotheinyl-2, 3-phenyl-1,2,4-thiadiazolyl-5, isothiazolyl-5, benzoisothiazolyl-3 or 1,3,4-thiadiazolyl-5 series or the phenyl series wherein the phenyl group is free of sulfonyl groups and may be substituted, by a maximum of 3 substituents 5-nitrothiazolyl-2,

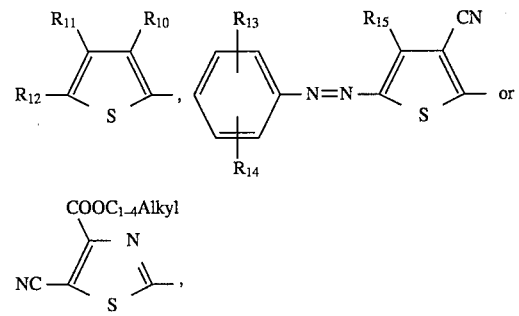

$R_{1a}$ is phenyl or phenyl substituted by 1 to 4 substituents each of which is independently halo, $C_{1-4}$alkyl, $C_{1-4}$alkoxy, trifluoromethyl, hydroxy, nitro, formyl, cyano, —SCN, ($C_{1-4}$alkyl)carbonyl, ($C_{1-4}$alkyl)carbonylamino, ($C_{1-4}$alkoxy)carbonyl, ($C_{1-4}$alkyl)carbonyloxy, carbamoyl, ($C_{1-2}$alkoxy)($C_{2-3}$alkoxy)carbonyl or phenyl, and $R_2$–$R_4$ and $R_{10}$–$R_{15}$ are as defined in the specification, and mixtures thereof, useful as disperse dyes particularly for dyeing and printing textile materials made of natural, synthetic or semi-synthetic hydrophobic organic materials.

22 Claims, No Drawings

AZO COMPOUNDS HAVING UNSUBSTITUTED OR SUBSTITUTED 2-PHENOXYCARBONYLETHYL GROUPS

This is a continuation of application Ser. No. 08.006,018, filed Jan. 15, 1993 and now abandoned, which is a continuation-in-part of U.S. application Ser. No. 07/728,431, filed Jul. 11, 1991 and now, abandoned.

This invention relates to new disperse dyes.

According to the invention, there is provided compounds of formula I

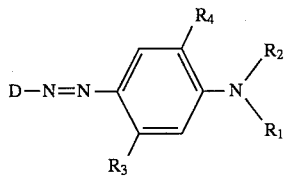

wherein

D is a diazo component radical of the triazolyl, pyrazolyl, cyano($C_{1-4}$alkyl)-imidazolyl, 4-chlorothiazolyl, 4-chlorothienyl-2,3-phenyl-1,2,4-thiadiazolyl-5, isothiazolyl-5, benzoisothiazolyl- 3 or 1,3,4-thiadiazolyl-5 series, the phenyl series wherein the phenyl group is free of sulphonyl groups and may be substituted by up to 3 substituents or the 5-nitrothiazolyl-2 series or a group of formula α, β or γ

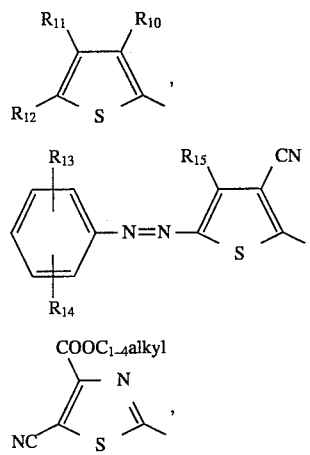

wherein $R_{10}$ is cyano, nitro, ($C_{1-4}$alkoxy)carbonyl, aminocarbonyl(carbamoyl), mono- or di-($C_{1-4}$alkyl)aminocarbonyl or ($C_{1-4}$alkyl)carbonyl, $R_{11}$ is hydrogen, $C_{1-4}$alkyl, phenyl or ($C_{1-4}$alkyl)carbonyl, $R_{12}$ is cyano, formyl, —CH=N—O($C_{1-4}$alkyl), nitro, phenylazo, ($C_{1-4}$-alkoxy)carbonyl, mono- or di-($C_{1-4}$alkyl)aminocarbonyl, aminosulphonyl (sulfamoyl), mono- or di-($C_{1-4}$alkyl)aminosulphonyl or ($C_{14}$alkyl)carbonyl, $R_{13}$ is hydrogen, $C_{1-4}$alkyl, halo or nitro, $R_{14}$ is hydrogen, halo, $C_{1-4}$alkoxy, cyano or nitro, and $R_{15}$ is hydrogen, $C_{1-4}$alkyl or phenyl;

$R_{15}$ is ($C_{1-6}$alkylene)-CO—O—$R_{1a}$, preferably ($C_{1-4}$alkylene)-CO—O—$R_{1a}$, and more preferably $CH_2$—$CH_2$—CO—O—$R_{1a}$;

wherein $R_{1a}$ is phenyl or phenyl substituted by 1 to 4 substituents each of which is independently halo, $C_{1-4}$alkyl, $C_{1-4}$alkoxy, trifluoromethyl, hydroxy, nitro, formyl, cyano, —SCN, ($C_{1-4}$alkyl)carbonyl, ($C_{1-4}$alkyl)carbonylamino, ($C_{1-4}$alkoxy)carbonyl, ($C_{1-4}$alkyl)carbonyloxy, aminocarbonyl, ($C_{1-2}$alkoxy)($C_{2-3}$alkoxy)carbonyl or phenyl;

$R_2$ is $C_{1-6}$alkyl, $C_{2-6}$alkenyl, halo($C_{2-6}$alkenyl), $C_{3-8}$alkynyl, cyano($C_{2-6}$alkyl), benzyl, phenylethyl, phenylpropyl, hydroxy($C_{1-6}$alkyl), ($C_{1-4}$alkoxy)$C_{1-4}$alkyl, ($C_{1-4}$alkoxy)carbonyl($C_{1-4}$alkyl), ($C_{1-4}$)carbonyloxy($C_{1-6}$alkyl) or ($C_{1-4}$alkoxy)carbonyloxy($C_{1-4}$alkyl) or, when D is a 2,4-dinitrophenyl group, unsubstituted or substituted in the 5- and/or 6-position, or a heterocyclic group, then $R_2$ may also be hydrogen, $R_4$ is hydrogen, halo, $C_{1-4}$alkoxy or ($C_{1-4}$alkoxy)$C_{2-4}$alkoxy, or $R_2$ and $R_4$ taken together with the nitrogen atom and the carbon atom to which they are respectively attached and the carbon atom connecting the said carbon and nitrogen atoms form a cyclic six-membered group, and $R_3$ is hydrogen, halo, hydroxy or $C_{1-4}$alkyl or, when D is 2-cyano-4-nitrophenyl, a heterocyclic group or a trisubstituted phenyl group, $R_3$ may also be formylamino (formamido), ($C_{1-3}$alkyl)carbonylamino, ($C_{2-3}$alkenyl)carbonylamino, ($C_{1-4}$alkoxy)($C_{1-4}$alkyl)carbonylamino, ($C_{1-4}$alkoxy)carbonylamino or $C_{1-3}$alkylsulphonylamino; with the proviso that when D is 2,5-dichloro-4-nitrophenyl, $R_4$ is hydrogen, $R_1$ is —$CH_2CH_2$—$COOC_6H_5$ and $R_2$ is —$CH_2CH_2CN$, then $R_3$ is not —NH—$COCH_3$.

When D is a diazo component radical of the thiadiazolyl-5 series, it is preferably of the 3-phenyl-1,2,4-thiadiazolyl-5 series.

Any $C_{1-4}$alkyl group is preferably ethyl or methyl and more preferably is methyl. Any $C_{1-4}$alkoxy group is preferably ethoxy or methoxy and is more preferably methoxy. Each halo is independently fluoro, chloro, bromo or iodo, preferably fluoro, chloro or bromo and most preferably chloro or bromo. Any alkylene radical is linear or branched.

In $R_1$, the alkylene radical is more preferably A', where A' is —$CH_2CH_2$—, —$CH_2CH_2$ $CH_2$—,

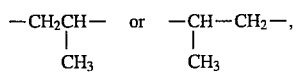

and most preferably A' is —$CH_2$—$CH_2$—.

In $R_{1a}$, any ($C_{1-2}$alkoxy)($C_{2-3}$alkoxy)carbonyl is preferably 2- or 3 -($C_{1-2}$alkoxy)($C_{2-3}$alkoxy)carbonyl.

Preferably D is Da where Da is a diazo compound of the 4-chlorothiazolyl series, 4-chlorothienyl-2; or 5-nitrothiazolyl-2 series, or a group of formula a) below.

Preferably Da is a diazo component selected from 4-chlorothiazolyl, 4-chlorothienyl-2 or 5-nitrothiazolyl or is a group of formula a) below.

Preferably $R_{1a}$ is $R_{1a}$' where $R_{1a}$' is phenyl, unsubstituted or substituted by one to four substituents selected from $C_{1-4}$alkyl, $C_{1-4}$alkoxy, ($C_{1-4}$alkoxy)carbonyl, $C_{1-4}$alkylcarbonyl and halogen and up to one phenyl group.

Preferably A' is $A_a$', where $A_a$' is —$(CH_2)_{2-3}$

Preferably D is D', where D' is selected from groups (a) to (h)

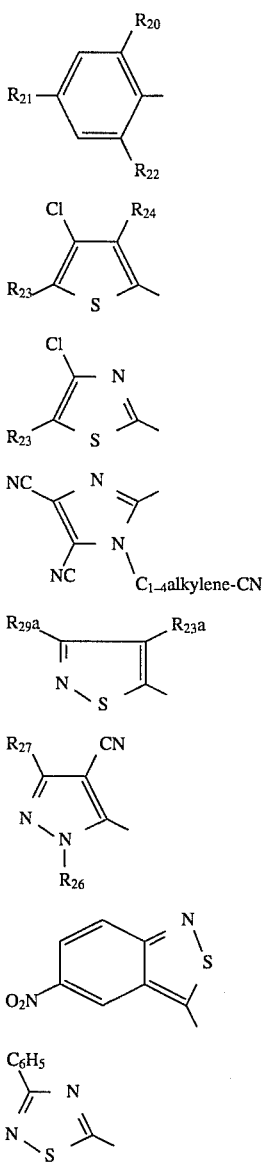

or D' is a diazo component of the 5-nitrothiazolyl series; wherein $R_{20}$ is hydrogen, $C_{1-4}$alkyl, halo, —CO—O($C_{1-4}$alkyl), cyano or nitro, preferably cyano or nitro, $R_{21}$ is halo, $C_{1-4}$alkyl, nitro or phenylazo, preferably nitro, $R_{22}$ is hydrogen, halo, cyano or ($C_{1-4}$alkoxy)carbonyl, preferably hydrogen, chloro, bromo or cyano, $R_{23}$ is formyl, cyano, —CH=N—O($C_{1-4}$alkyl) or —CH=C(CN)$R_{25a}$, wherein $R_{25a}$ a is cyano or ($C_{1-4}$alkoxy)carbonyl, and $R_{23a}$ is cyano, nitro or —CO—O($C_{1-4}$alkyl), $R_{24}$ is ($_{1-4}$alkoxy)carbonyl, nitro or cyano, $R_{26}$ is cyano($C_{1-4}$alkyl) or phenyl, $R_{27}$ is $C_{1-4}$alkyl or cyano($C_{1-4}$alkyl), and $R_{29}$ is $C_{1-4}$alkyl or phenyl.

In $R_{21}$, the phenyl group may be substituted by 1 to 4, preferably not more than 3, substituents each of which is independently $C_{1-4}$alkyl, nitro, halo or $C_{1-4}$alkoxy. D is most preferably D", where D" is 2 cyano-4-nitrophenyl, 2,4-dinitro-6-bromophenyl,,2,6-dichloro- 4-nitro phenyl or 2,4-dinitro-6-chlorophenyl.

Preferably, $R_1$ is $R_1$', where $R_1$' is a group of formula (j)

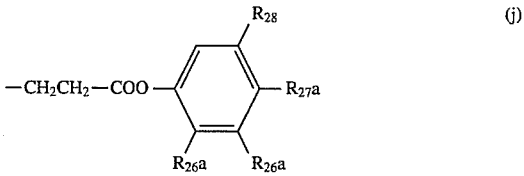

wherein each $R_{26a}$ is independently hydrogen, fluoro, chloro, ($C_{1-2}$alkoxy)carbonyl, methyl, methoxy or ethoxy, $R_{27a}$ is hydrogen, fluoro, chloro, bromo, methyl, methoxy, ethoxy, ($C_{1-2}$alkoxy)carbonyl or phenyl, and $R_{28}$ is hydrogen, methyl, methoxy or ethoxy.

Preferably, the phenyl ring of the group of formula (j) contains a maximum of three substituents, more preferably a maximum of two substituents.

Preferably, there are at least two carbon atoms between any oxygen atom in $R_2$ and the nitrogen atom to which $R_2$ is attached and no carbon atom of $R_2$ that is part of a double or triple bond is directly attached to the nitrogen atom to which $R_2$ is attached. $R_2$ is more preferably $R_2$', where $R_2$' is methyl, ethyl, allyl, 2-methylallyl, chloroallyl, propynyl, ($C_{1-2}$alkyl)carbonyloxyethyl or ($C_{1-2}$alkoxy)carbonyloxy-ethyl and most preferably methyl.

$R_3$ is preferably $R_3$', where $R_3$' is hydrogen, methyl or ($C_{1-2}$alkyl)carbonylamino, and more preferably $R_3$", where $R_3$" is hydrogen or methyl.

The $C_{1-4}$alkoxy group of any ($C_{1-4}$alkoxy)($C_{2-4}$alkoxy) group as $R_4$ is preferably in other than the 1-position. $R_4$ is preferably $R_4$', where $R_4$' is hydrogen or $C_{1-4}$alkoxy (preferably methoxy or ethoxy), and most preferably hydrogen.

When $R_2$ and $R_4$ are part of a six-membered heterocyclic ring, the ring preferably contains no hetero atom other than the nitrogen atom to which $R_2$ is attached and is unsubstituted or substituted by 1 to 4, more preferably 1, 2 or 3, substituents each of which is independently $C_{1-2}$alkyl and most preferably methyl.

The preferred compounds of formula I are those wherein D is D', the alkylene radical in $R_1$ is A', $R_{1a}$' is a phenyl or substituted phenyl group as in formula (j), $R_2$ is $R_2$', $R_3$ is $R_3$', and $R_4$ is $R_4$'. Those of this group wherein $R_1$ is a group of formula (j) are more preferred, with those of this group wherein D is D" being even more preferred. The compounds of formula I wherein D is D', $R_1$ is a group of formula (j) the phenyl ring of which has not more than three (more preferably not more than two) substituents, $R_2$ is $R_2$', $R_3$ is $R_3$", and $R_4$ is hydrogen are also more preferred, with those of this group wherein D is D" being most preferred.

Especially preferred compounds of formula I are of formulae Ia to Ic

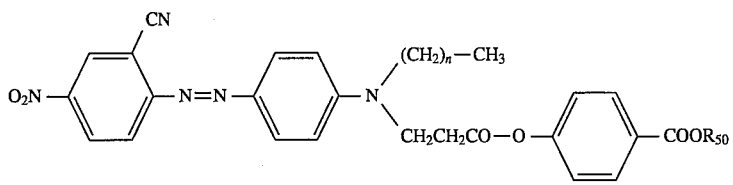

(1a)

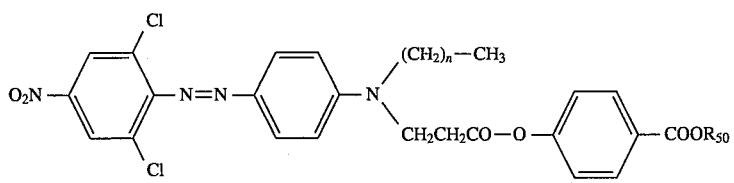

(1b)

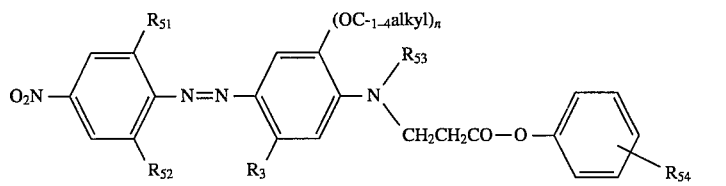

(1c)

wherein n is 0 or 1;

$R_{50}$ is $C_{1-4}$alkyl;

$R_{51}$ is $NO_2$ or CN;

$R_{52}$ is halogen (preferably Cl or Br) or CN;

$R_{53}$ is a significance of $R_2$ other than hydrogen; and $R_{54}$ is $C_{1-4}$alkyl, $C_{1-4}$alkoxy, $C_{1-4}$alkoxycarbonyl or $C_{1-4}$alkylcarbonyl.

The compounds of formula I can be synthesized by reacting a diazotized amine of formula II $$D{-}NH_2 \qquad (II)$$

with one mole of a compound of formula III per mole of the compound of formula II

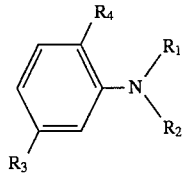

(III)

The compounds of formulae II and III are known or can be synthesized from known compounds by known methods.

The compounds of formula I can be incorporated into dyeing preparations by known methods, for example by milling in the presence of a dispersing agent and/or filler. The preparations can then be granulated (optionally under vacuum) by the use of a fluidized bed or by atomizing to form dry preparations. These dry preparations can then be dispersed in a little or a lot of water to form short or long dyebaths for use in exhaust dyeing, padding or printing processes.

The compounds of formula I can be exhausted from an aqueous liquor onto textile materials of natural, semi-synthetic or fully synthetic hydrophobic, high molecular weight organic materials. In particular, the compounds of formula I can be used to dye and print textile materials of linear aromatic polyesters as well as of cellulose 2½ acetate and cellulose triacetate.

Dyeing, printing and padding can be carried out by known methods, for example as described in French Patent 1,445,371.

The dyeings that result from application of the compounds of formula I have good properties, for example good thermomigration, fastness, good light fastness, good thermofixation, good sublimation and good blistering fastness properties as well as good wet fastness properties, especially using a permanent press machine. The compounds of formula I have good fastness properties, especially thermomigration properties (for example, in the Marks & Spencer's (M&S) C4A 60° C. Test).

The invention will now be illustrated by the following examples in which all temperatures are in °C.

EXAMPLE 1

16.3 parts of 2-amino-5-nitrobenzonitrile are stirred into 100 parts of cold sulfuric acid (93%) and then reacted at 0°–5° C. over 30 minutes with 30 parts nitrosyl sulfuric acid (40%). The mixture is stirred for a further 3 to 4 hours at 0°–5° C. and is poured while stirring well, onto a mixture of 26.9 parts 3-(N-methyl-N-phenylamino)propionic acid 2-methylphenyl ester, 100 parts glacial acetic acid, 2 parts of amidosulfonic acid, 200 parts water and 500 parts ice. The resulting dyestuff is filtered, washed acid-free with water and dried under vacuum at 60° C.

The resulting dyestuff is of formula 1a

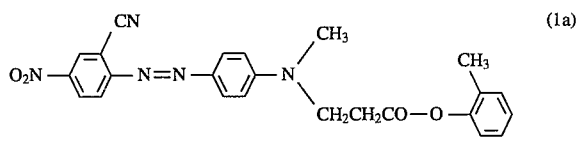

(1a)

and has a $\lambda_{max.}$ of 532 nm. It dyes polyester fiber material a ruby-red tone. The dyeing has excellent fastness properties.

EXAMPLE 2

Example 1 is repeated except that the 26.9 parts of 3-(N-methyl-N-phenylamino)propionic acid 2'-methylphenyl ester is replaced by 29.9 parts 3-(N-ethyl-N-phenylamino)propionic acid 2'-methoxyphenyl ester. The resulting dyestuff of formula 2a

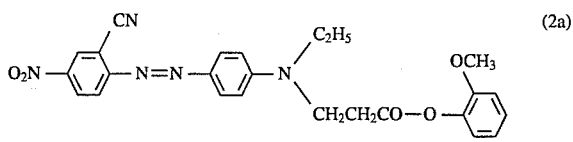

has a $\lambda_{max.}$=of 535 nm. It dyes polyester fiber material a bluish-ruby red tone. The dye has excellent fastness properties and is particularly useful in the rapid dyeing process.

EXAMPLE 3

20.7 parts of 1-amino-2,6-dichloro-4-nitrobenzene is stirred into 100 parts of sulfuric acid (93%) and reacted at 30° C. over 1 hour with 32 parts nitrosylsulfuric acid (40%). The mixture is stirred for 2–3 hours at 30–32° C. and the resulting diazonium salt solution is added drop-wise to a mixture to 28.5 parts 3-(N-methyl-N-phenylamino)propionic acid 4'-methoxyphenyl ester, 50 parts of glacial acetic acid, 20 parts of water, 300 parts ice and 0.5 parts amidosulfonic acid. The mixture is then slowly diluted with 500 parts water. The resulting dyestuff is filtered, washed acid free with water and dried under vacuum at 60° C.

The resulting dyestuff of formula 3a

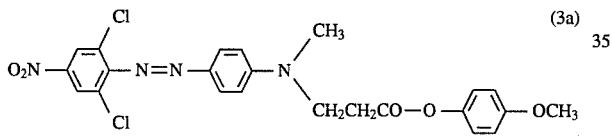

has a $\lambda_{max.}$=439 nm. It dyes polyester fiber material a yellow-brown tone and is particularly useful for rapid dyeing. The resulting dyeings have excellent fastness properties.

EXAMPLE 4

4.1 parts 2-amino-4-chloro-5-formylthiazole are added to 50 parts of 85% phosphoric acid at −10° to −5° C. over 30 minutes and are then reacted with 8 parts nitrosylsulfuric acid (40%). This is stirred for a further 3–4 hours at −5° C. and then the resulting mixture is poured while stirring well into a mixture of 7.9 parts of 3-(N-ethyl-N-3'-methylphenylamino)propionic acid 3"-methoxyphenyl ester, 50 parts glacial acetic acid, 20 parts water and 250 parts ice. This mixture is then stirred for 30 minutes and diluted by the slow addition of 500 parts ice water. The resulting dyestuff is filtered, washed acid-free with water and dried under vacuum.

The resulting dyestuff of formula 4a

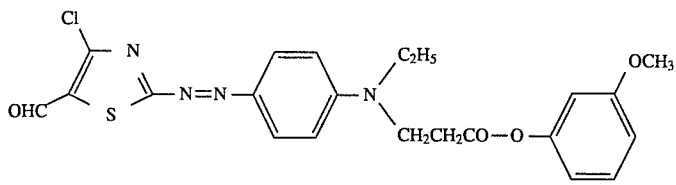

has a $\lambda_{max.}$=586 nm. It dyes polyester fiber material a bluish-violet tone, and the resulting dyeings have good fastness properties. The dye of formula 4a is particularly useful for rapid dyeing.

EXAMPLE 5

14.5 parts of 2-amino-5-nitrothiazole are stirred into a mixture of 75 parts of sulfuric acid (93%), 85 parts of glacial acetic acid and 15 parts of propionic acid. This is then reacted at 0°–2° C. over 30 minutes with 32 parts of nitrosylsulfuric acid (40%). This is stirred for a further 1–2 hours at 0°–2° C. and then is poured while stirring slowly onto a mixture of 28.5 parts of 3-(N-methyl-N-phenylamino)propionic acid 3'-methoxyphenyl ester, 50 parts of glacial acetic acid, 20 parts of water, 300 parts of ice and 0.5 parts of amidosulfonic acid. This mixture is then slowly diluted with about 500 parts of water. The resulting dyestuff is filtered, washed acid-free with water and added under vacuum at 60° C.

The resulting dyestuff is a compound of formula 5a

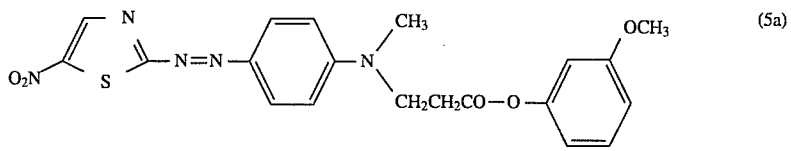

and has a $\lambda_{max.}$=584 nm. It dyes polyester fiber material a bluish-violet tone and the resulting dyeings have excellent fastness properties. The dye is particularly useful for rapid dyeing.

EXAMPLE 6

19.6 parts of 1-amino-2-methoxycarbonyl-4-nitrobenzene are dissolved at 60° C. in 70 parts of glacial acetic acid. The resulting solution is poured while stirring well onto a mixture of 150 parts of ice and 30 parts of hydrochloric acid (ca. 30%). To the resulting fine suspension, a solution of 7 parts of sodium nitrite in 100 parts of water is added drop-wise at 0–5° C. over 1 hour. This is then stirred for a further 3 hours at 0–5° C. The resulting solution is then reacted with 0.5 parts amidosulfonic acid and then added drop-wise over 15–20 minutes to a solution of 28.5 parts 3-(N-methyl-N-phenylamino)propionic acid 3'-methoxyphenyl ester in 50 parts of glacial acetic acid. Sodium acetate is added to assist in completing the coupling reaction. The resulting dyestuff is filtered, washed with water and dried under vacuum.

The resulting compound is of formula 6a

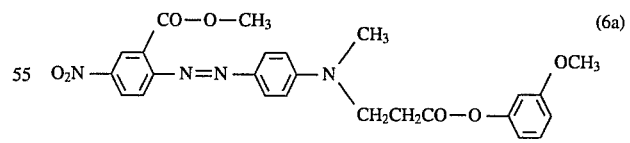

and has a $\lambda_{max.}$=493 nm. It dyes polyester fiber material a scarlet red tone with good fastness properties. The dyestuff is particularly useful for rapid dyeing.

EXAMPLES 7–53

Compounds of the formula

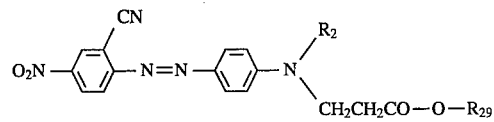

in which $R_2$ and $R_{29}$ are given in Table 1 below can be prepared from known compounds by a method analogous to that of Example 1.

TABLE 1

| Example Number | $R_2$ | $R_{29}$ | Nuance on polyester |
|---|---|---|---|
| 7 | $-C_2H_5$ | 2-($CO-O-C_2H_5$)-phenyl | rubine |
| 8 | $-CH_3$ | 4-($CO-O-C_3H_7$-n)-phenyl | " |
| 9 | " | 3-$CH_3$-phenyl | " |
| 10 | " | 3-Cl, 4-$CH_3$-phenyl | " |
| 11 | " | 4-Cl, 3-$CH_3$-phenyl | " |
| 12 | " | 4-SCN-phenyl | " |
| 13 | " | 4-$COCH_3$-phenyl | " |
| 14 | $C_2H_5$ | " | " |
| 15 | $-CH_3$ | 3,4-di-$CH_3$-phenyl | " |
| 16 | " | 3-$COOC_2H_5$-phenyl | " |

TABLE 1-continued
| Example Number | $R_2$ | $R_{29}$ | Nuance on polyester |
|---|---|---|---|
| 17 | $C_2H_5$ | 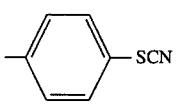 —SCN | " |
| 18 | —$CH_3$ | " | " |
| 19 | $C_2H_5$ | 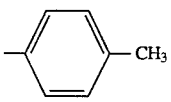 —$CH_3$ | " |
| 20 | —$CH_2CH_2OCOOCH_3$ | 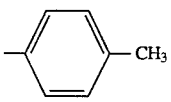 $OCH_3$ | red. |
| 21 | —$CH_2CH_2OCOOC_4H_9n$ | " | " |
| 22 | —$CH_3$ | 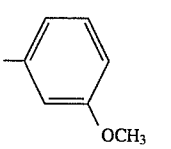 $OC_2H_5$ | rubine |
| 23 | $C_2H_5$ | " | rubine |
| 24 | —$CH_3$ |  F | " |
| 25 | " | 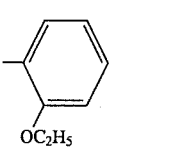 —Br | " |
| 26 | $C_2H_5$ |  —$OCH_3$ | " |
| 27 | " | 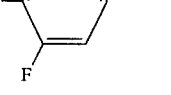 $COCH_3$ | " |
| 28 | —$CH_3$ | 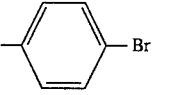 —$CH_3$ | " |
| 29 | " | 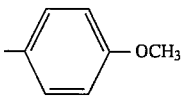 —$NHCOCH_3$ | " |
| 30 | —$CH_3$ | 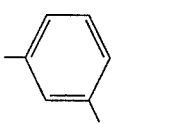 $COOCH_3$ | " |
| 31 | $C_2H_5$ | " | " |

TABLE 1-continued

| Example Number | $R_2$ | $R_{29}$ | Nuance on polyester |
|---|---|---|---|
| 32 | " | 3-CF₃-phenyl | " |
| 33 | —CH₃ | " | " |
| 34 | —CH₃ | 3-OCOCH₃-phenyl | " |
| 35 | C₂H₅ | " | " |
| 36 | —CH₃ | 2-OCH₃-phenyl | " |
| 37 | " | 3-COOCH₃-phenyl | " |
| 38 | " | 4-COOCH₃-phenyl | " |
| 39 | " | 4-COOC₂H₅-phenyl | " |
| 40 | C₂H₅ | 3-COOCH₃-phenyl | " |
| 41 | —CH₃ | 4-Cl-phenyl | rubine |
| 42 | " | 4-OC₂H₅-phenyl | " |
| 43 | " | 3-F-phenyl | " |
| 44 | " | 4-F-phenyl | " |

TABLE 1-continued

| Example Number | $R_2$ | $R_{29}$ | Nuance on polyester |
|---|---|---|---|
| 45 | $-CH_2CH_2OCOOCH_3$ | ![phenyl-OCH3 (ortho)] | red |
| 46 | $-CH_3$ | ![phenyl-COCH3 (meta)] | rubine |
| 47 | " | ![phenyl-COOC2H4OCH3 (para)] | " |
| 48 | " | ![phenyl-OCH3 (para)] | " |
| 49 | $C_2H_5$ | ![phenyl] | " |
| 50 | $-CH_3$ | ![phenyl-OCH3 (meta)] | " |
| 51 | " | ![phenyl-OC2H5 (meta)] | " |
| 52 | " | ![phenyl-CN (meta)] | " |
| 53 | " | ![phenyl] | " |

EXAMPLES 54–151

Compounds of the formula

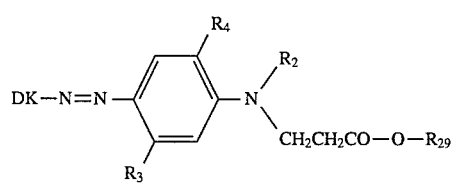

in which the symbols are defined in Table 2 can be prepared from known compounds by a method analogous to that of Example 1.

TABLE 2
| Ex. # | DK | $R_2$ | $R_3$ | $R_4$ | $R_{29}$ | Nuance on polyester |
|---|---|---|---|---|---|---|
| 54 | 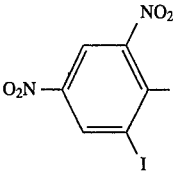 | —CH$_2$C≡CH | —NHCOCH$_3$ | —OCH$_3$ | 2-methoxyphenyl | navy blue |
| 55 | " | —CH$_2$CH=CHCl | " | " | " | " |
| 56 | 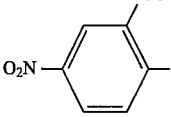 | —CH$_2$CH$_3$ | H | H | " | scarlett |
| 57 | 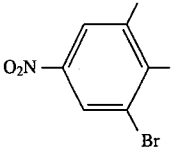 | " | H | H | " | violet |
| 58 | 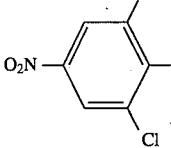 | " | H | H | 3-methoxyphenyl | " |
| 59 | 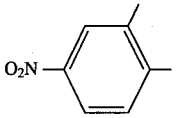 | " | —NHCOCH$_3$ | H | 2-methoxyphenyl | reddish violet |
| 60 | " | —CH$_3$ | " | H | " | " |
| 61 | 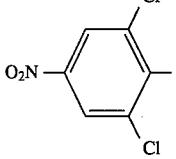 | " | H | H | " | yellow brown |
| 62 | 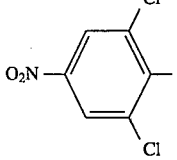 | —C$_2$H$_5$ | H | H | 3-methoxyphenyl | " |
| 63 | 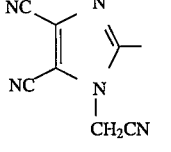 | —C$_4$H$_9$n | —CH$_3$ | H | " | red |
| 64 | " | —C$_3$H$_7$n | " | H | 2-methoxy-phenyl | " |

TABLE 2-continued

| Ex. # | DK | R₂ | R₃ | R₄ | R₂₉ | Nuance on polyester |
|---|---|---|---|---|---|---|
| 65 | 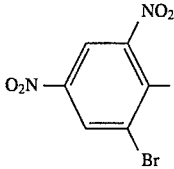 | —CH₂C≡CH | —NHCOCH₃ | —OC₂H₄OCH₃ | 3-methylphenyl | navy blue |
| 66 | " | —C₂H₅ | —NHCHO | " | 3-methoxyphenyl | " |
| 67 | 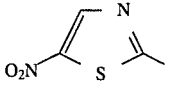 | —CH₃ | —CH₃ | H | " | bluish violet |
| 68 | 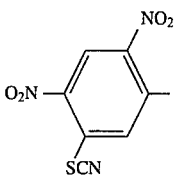 | —C₂H₅ | " | H | " | reddish blue |
| 69 | " | —CH₃ | " | H | 3-methylphenyl | " |
| 70 | 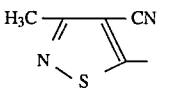 | —C₂H₅ | " | H | 2-methylphenyl | red |
| 71 | " | " | " | H | 2-methoxycarbonyl phenyl | " |
| 72 | 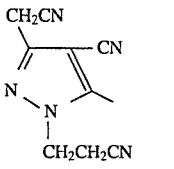 | " | " | H | —C₆H₅ | " |
| 73 | 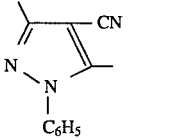 | —C₂H₅ | " | H | 3-methoxyphenyl | bluish red |
| 74 | " | —CH₃ | " | H | 2-methoxyphenyl | " |
| 75 | 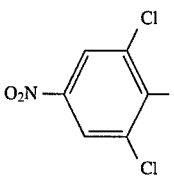 | " | H | H | 4-acetylphenyl | yellow brown |
| 76 | " | —C₂H₅ | H | H | " | " |
| 77 | " | —CH₂CH₂OCOCH₃ | H | H | " | " |
| 78 | 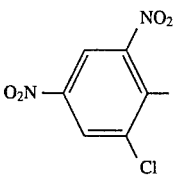 | —CH₃ | —NHCOCH₃ | —OCH₃ | —C₆H₅ | navy blue |
| 79 | " | —C₂H₅ | " | " | " | " |
| 80 | " | —H₂CH=CH₂ | " | " | " | " |
| 81 | " | —CH₂CH=CHCl | " | " | " | " |

TABLE 2-continued

| Ex. # | DK | R₂ | R₃ | R₄ | R₂₉ | Nuance on polyester |
|---|---|---|---|---|---|---|
| 82 | " | " | " | " | 3-methoxyphenyl | " |
| 83 | 4-O₂N, 2-NO₂, 3-Br-phenyl (with CH at position) | " | " | " | " | " |
| 84 | " | —C₂H₅ | —NHCOC₂H₅ | " | 2-methoxyphenyl | " |
| 85 | 4-O₂N, 2-NO₂, 3-Br-phenyl | —C₂H₅ | —NHCOCH₃ | —OC₂H₅ | 2-methoxyphenyl | navy blue |
| 86 | " | —CH₃ | " | " | 3-methylphenyl | " |
| 87 | " | CH₂CH₂OCOCH₃ | " | " | " | " |
| 88 | " | " | " | —OCH₃ | 2-methoxycarbonyl-phenyl | " |
| 89 | " | —CH₂C≡CH | —NHCOC₂H₅ | " | 4-actylphenyl | " |
| 90 | " | —C₂H₅ | NHCOCH=CH₂ | " | 4-methylphenyl | " |
| 91 | 4-O₂N, 2-NO₂, 3-CN-phenyl | —CH₂C≡CH | —NHCOCH₃ | OC₂H₅ | 3-methylphenyl | " |
| 92 | Cl—C(CHO)=C—S—C(N)=C(CH₃) thiazole | " | " | " | " | " |
| 93 | " | —C₂H₅ | " | " | " | " |
| 94 | " | —CH₃ | " | " | 3-methoxyphenyl | " |
| 95 | " | —C₂H₅ | " | —OCH₃ | 2-methoxyphenyl | " |
| 96 | " | —CH₂CH=CHCl | " | OC₂H₅ | " | " |
| 97 | Cl—C(CHO)=C—S—C(N)=C (thiazole) | —CH₂C≡CH | —NHCOCH₃ | " | 2-methoxycarbonyl-phenyl | navy blue |
| 98 | 4-O₂N, 2,6-diCl-phenyl | —CH₃ | H | H | 2-fluorophenyl | yellow brown |
| 99 | " | " | H | H | 4-methoxycarbonyl-phenyl | " |
| 100 | Cl—C(CHO)=C—S—C(CN)=C thiophene | —C₂H₅ | —CH₃ | H | 4-methoxycarbonyl-phenyl | reddish blue |

TABLE 2-continued

| Ex. # | DK | R₂ | R₃ | R₄ | R₂₉ | Nuance on polyester |
|---|---|---|---|---|---|---|
| 101 | 2,5-dichloro-4-nitrophenyl (O₂N—C₆H₂(Cl)(Cl)—) | " | H | H | 4-methoxycarbonyl-phenyl | yellow brown |
| 102 | " | " | H | H | 2-methoxyphenyl | " |
| 103 | " | " | H | H | 4-methoxy-phenyl | " |
| 104 | " | —CH₃ | H | H | 3-methoxy-phenyl | " |
| 105 | " | " | H | H | 2-methoxy-phenyl | " |
| 106 | 3-bromo-2-chloro-4-nitrophenyl | " | H | H | 4-methoxy-phenyl | " |
| 107 | " | " | H | H | 3-methoxy-phenyl | " |
| 108 | 3-bromo-2-fluoro-4-nitrophenyl | —CH₃ | H | H | 4-methoxyphenyl | yellow brown |
| 109 | 3-chloro-2-fluoro-4-nitrophenyl | " | H | H | " | " |
| 110 | 2,5-difluoro-4-nitrophenyl | " | H | H | " | " |
| 111 | 3-bromo-2,6-dinitrophenyl | —CH₂C≡CH | —NHCOCH₃ | —OC₂H₅ | 3-methoxyphenyl | navy blue |
| 112 | " | —C₂H₅ | " | " | 2-methoxyphenyl | " |
| 113 | 6-nitro-benzisothiazolyl | —C₂H₅ | H | H | " | reddish blue |
| 114 | " | " | —CH₃ | H | —C₆H₅ | " |
| 115 | 3-chloro-4-ethoxycarbonyl-2-cyano-thienyl | —CH₃ | " | H | 3-methoxyphenyl | violet |

TABLE 2-continued

| Ex. # | DK | $R_2$ | $R_3$ | $R_4$ | $R_{29}$ | Nuance on polyester |
|---|---|---|---|---|---|---|
| 116 | " | $-C_2H_5$ | " | H | $-C_6H_5$ | " |
| 117 | 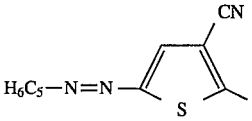 | " | H | H | " | navy blue |
| 118 | 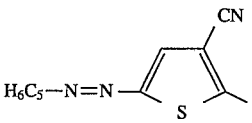 | $-CH_3$ | $-CH_3$ | H | 3-methylphenyl | navy blue |
| 119 | 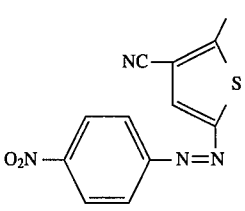 | $-CH_2CH_2OCH_3$ | H | H | 4-chlorophenyl | " |
| 120 | " | " | H | H | 2-methoxyphenyl | " |
| 121 | 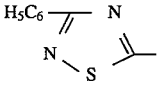 | $-C_2H_5$ | H | H | " | red |
| 122 | " | $-CH_3$ | H | H | $-C_6H_5$ | " |
| 123 | 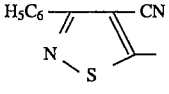 | " | H | H | 2-methoxyphenyl | red |
| 124 | " | " | $-CH_3$ | H | $-C_6H_5$ | " |
| 125 | 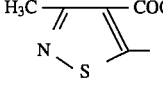 | $-C_2H_5$ | H | H | " | red |
| 126 | " | $-CH_2CH=CH_2$ | H | H | 2-methyl-phenyl | " |
| 127 | 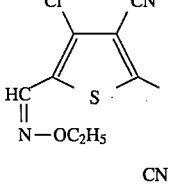 | $-C_2H_5$ | $-NHCOCH_3$ | H | 3-methoxyphenyl | blue |
| 128 | 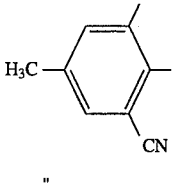 | " | " | H | $-C_6H_5$ | red |
| 129 | " | " | $NHCOCH_2OCH_3$ | H | 2-methoxyphenyl | " |
| 130 | 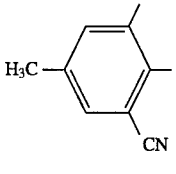 | " | $-NHSO_2CH_3$ | H | 2-methoxy-4-methyl-phenyl | red |

TABLE 2-continued

| Ex. # | DK | $R_2$ | $R_3$ | $R_4$ | $R_{29}$ | Nuance on polyester |
|---|---|---|---|---|---|---|
| 131 | " | —CH(CH₃)CH₂CH₃ | " | H | 2-fluorophenyl | " |
| 132 | 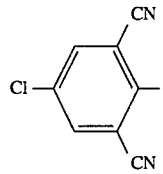 | —CH₃ | —NHCOOCH₃ | H | 3-trifluoromethyl-phenyl | " |
| 133 | 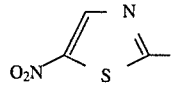 | " | —NHCOCH₃ | —OCH₃ | —C₆H₅ | navy blue |
| 134 | " | —CH₂C≡CH | " | —OCH₂CH₃ | 2-methoxyphenyl | " |
| 135 | " | —C₂H₅ | " | —OCH₃ | —C₆H₅ | " |
| 136 | 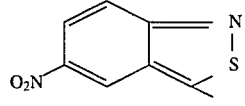 | —CH₂CH₂OH | H | H | " | " |
| 137 | 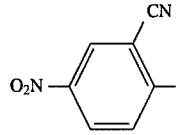 | —C₂H₅ | —Cl | H | " | bluish rubine |
| 138 | " | " | —NHCOCH₃ | H | 2-methoxy-phenyl | reddish violet |
| 139 | 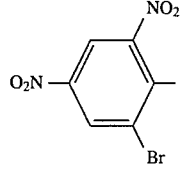 | H | " | —OCH₃ | " | navy blue |
| 140 | 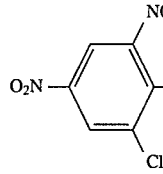 | H | " | " | 4-methoxy-carbonyl-phenyl | " |
| 141 | " | " | —NHCOCH₂CH₃ | OC₂H₅ | —C₆H₅ | blue |
| 142 | 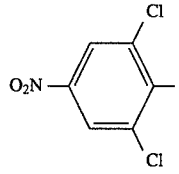 | —CH₃ | H | H | 4-ethoxy-phenyl | yellow brown |
| 143 | 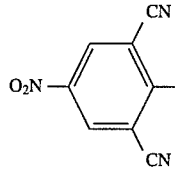 | " | —CH₃ | H | 2-methoxy-phenyl | bluish violet |
| 144 | " | —CH₃ | H | H | 2-fluoro-phenyl | violet |

TABLE 2-continued

| Ex. # | DK | $R_2$ | $R_3$ | $R_4$ | $R_{29}$ | Nuance on polyester |
|---|---|---|---|---|---|---|
| 145 | 2,4-dichloro-5-(O_2N) phenyl (Cl, O_2N, Cl substituted) | " | H | —OCH_3 | 3-nitro-phenyl | yellow brown |
| 146 | " | " | H | H | 4-fluoro-phenyl | " |
| 147 | " | " | H | H | 2-fluoro-phenyl | " |
| 148 | 2-Br-4-(O_2N)-5-NO_2 phenyl | CH_2CH_2OCOCH_3 | —NHCOCH_3 | —OCH_3 | 2-methoxy-phenyl | navy blue |
| 149 | " | " | " | —OCH_2CH_2 | —C_6H_5 | " |
| 150 | 2-Cl-4-(O_2N)-5-NO_2 phenyl | CH_2CH_2OCOOCH_3 | " | —OCH_3 | 2-methyl-phenyl | " |
| 151 | 2-Br-4-(O_2N)-5-NO_2 phenyl | —CH_2—CH(OCOCH_3)—CH_3 | —NHCOCH_2CH_3 | " | 3-methoxy-phenyl | " |

EXAMPLES 152–182

Compounds of the formula

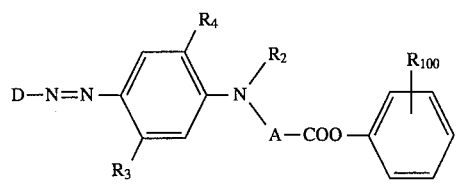

in which the symbols are defined in Table 3 can be made by a method analogous to any one of Examples 1–6 from known compounds.

TABLE 3

| Ex. # | D | $R_2$ | $R_3$ | $R_4$ | $R_{100}$ | A | nuance on polyester | λmax nm |
|---|---|---|---|---|---|---|---|---|
| 152 | 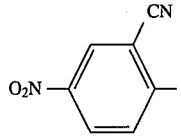 | —CH_3 | H | H | H | —CH_2CH_2CH_2— | rubine | 541 |

TABLE 3-continued

| Ex. # | D | $R_2$ | $R_3$ | $R_4$ | $R_{100}$ | A | nuance on polyester | $\lambda max \cdot$ nm |
|---|---|---|---|---|---|---|---|---|
| 153 | 2,6-dichloro-4-nitrophenyl | " | H | H | H | " | yellow brown | 446 |
| 154 | " | " | H | H | $3\text{-OCH}_3$ | " | " | 446 |
| 155 | 2-cyano-4-nitro-6-methyl-phenyl | " | H | H | " | " | rubine | 541 |
| 156 | " | " | H | H | " | $-\text{CH}-\text{CH}_2-$ <br>     $\vert$ <br>     $\text{CH}_3$ | " | |
| 157 | " | " | H | H | $2\text{-OCH}_3$ | $-\text{CH}_2\text{CH}-$ <br>         $\vert$ <br>         $\text{CH}_3$ | " | |
| 158 | " | " | H | H | $3\text{-CH}_3$ | $-\text{CH}_2\text{CH}_2\text{CH}_2\text{CH}_2-$ | " | |
| 159 | 3-chloro-4-cyano-5-methyl-2-formyl-thiophene | $-\text{C}_2\text{H}_5$ | $-\text{CH}_3$ | H | $2\text{-OCH}_3$ | " | blue | |
| 160 | " | " | " | H | $3\text{-OCH}_3$ | $-\text{CH}_2\text{CH}_2\text{CH}_2-$ | " | |
| 161 | 3-chloro-2-formyl-thiazole | " | " | H | " | " | bluish violet | |
| 162 | " | " | $-\text{NHCOCH}_3$ | $-\text{OCH}_3$ | " | " | blue | |
| 163 | 3-bromo-2-methyl-4,6-dinitrophenyl | $-\text{CH}_2\text{C}\equiv\text{CH}$ | " | $\text{OC}_2\text{H}_5$ | " | " | blue | |
| 164 | " | $\text{CH}_2\text{CH}=\text{CHCl}$ | " | $-\text{OCH}_3$ | " | " | " | |
| 165 | 3-bromo-2-methyl-4,6-dinitrophenyl | H | $-\text{NHCOCH}_3$ | $-\text{OC}_2\text{H}_5$ | $4\text{-OCH}_3$ | $-\text{CH}_2\text{CH}_2-$ | blue | |
| 166 | " | $-\text{CH}_2\text{C}=\text{CH}$ | " | " | " | " | " | |
| 167 | " | " | " | " | $-\text{OCH}_3$ | $4\text{-COOC}_2\text{H}_5$ | " | " |
| 168 | " | " | " | " | " | $4\text{-COOCH}_3$ | " | " |
| 169 | 3-chloro-2-methyl-4,6-dinitrophenyl | " | " | " | " | " | " | |

TABLE 3-continued

| Ex. # | D | $R_2$ | $R_3$ | $R_4$ | $R_{100}$ | A | nuance on polyester | $\lambda$max nm |
|---|---|---|---|---|---|---|---|---|
| 170 | Cl—⟨CN⟩—CH₃ (thiophene, OHC, S) | $-C_2H_5$ | $CH_3$ | H | 3-$CH_3$ | " | reddish blue | |
| 171 | " | " | " | H | 2-$OCH_3$ | " | " | |
| 172 | " | $-CH_3$ | H | H | 3,4-di-$CH_3$ | " | violet | |
| 173 | " | $-C_2H_5$ | $-CH_3$ | H | 3-$OCH_3$ | " | reddish blue | |
| 174 | " | $-CH_3$ | " | $-OCH_3$ | 2-$CH_3$ | " | blue | |
| 175 | Cl—⟨N⟩ (thiophene, OHC, S) | " | H | H | 3-$OCH_3$ | " | violet | |
| 176 | " | $-C_2H_5$ | $-CH_3$ | H | 2-$OCH_3$ | " | " | |
| 177 | " | H | $-NHCOCH_3$ | $-OCH_3$ | 3-$CH_3$ | " | " | |
| 178 | " | $-CH_2C\equiv CH$ | " | " | " | " | blue | |
| 179 | " | " | " | $-OC_2H_5$ | 4-$OCH_3$ | " | " | |
| 180 | " | $-C_2H_5$ | $-CH_3$ | H | 3-$CH_3$ | " | violet | |
| 181 | " | $-CH_2C\equiv CH$ | $-NHCOCH_3$ | $-OCH_3$ | 4-$OCH_3$ | " | blue | |
| 182 | " | " | " | " | 4-$OC_2H_5$ | " | " | |

Examples 183–190

Compounds of the formula

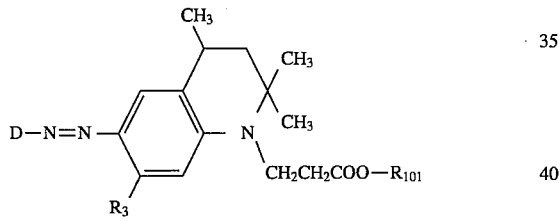

in which the symbols are defined in Table 4 below can be prepared from known compounds by a method analogous to any one of Example 1–6.

TABLE 4

| Ex. # | D | $R_3$ | $R_{101}$ | Nuance on polyester |
|---|---|---|---|---|
| 183 | $O_2N$—⟨$NO_2$, Br⟩ | $-CH_3$ | 3-methoxy-phenyl | blue |
| 184 | " | $-NHCOCH_3$ | 2-methoxy-phenyl | " |
| 185 | " | " | $-C_6H_5$ | " |
| 186 | Cl—⟨N⟩ (CHO, S) | " | " | " |
| 187 | " | " | 2-methoxy-carbonylphenyl | " |

TABLE 4-continued

| Ex. # | D | $R_3$ | $R_{101}$ | Nuance on polyester |
|---|---|---|---|---|
| 188 | " | $CH_3$ | 2-methoxy-phenyl | " |
| 189 | Cl—⟨thiophene with CN, CHO, S⟩ | " | " | " |
| 190 | " | $-NHCOCH=CH_2$ | 4-fluoro-phenyl | " |

EXAMPLE 191

16.3 parts of 2-amino-5-nitrobenzonitrile are stirred into 100 parts of cold sulphuric acid (93%) and are then reacted at 0–5° C. over 30 minutes with 32 parts of nitrosylsulphuric acid (40%). This is stirred for 3 to 4 hours at 0–5° C. and this is then poured into a mxiture of 13.5 parts of 3-(N-methyI-N-phenylamino)propionic acid 2'-methylphenyl ester, 13.5 of 3-(N-methyI-N-phenyl-amino)propionic acid 4'-methylphenyl ester, 100 parts of glacial acetic acid, 2 parts of amidosulphonic acid, 200 parts of water and 500 parts of ice. Coupling is terminated by adding sodium acetate. The resulting dyestuff is filtered, washed with water and vacuum dried at 60° C. The resulting mixture comprises a 1:1 mixture of the compounds of the formulae

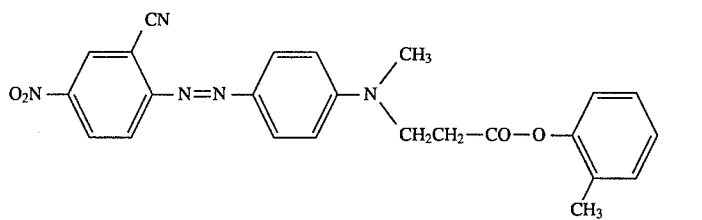

($\lambda_{max.}$ = 532 nm)

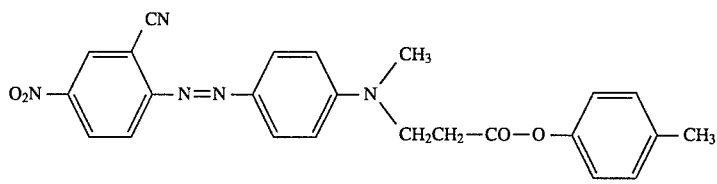

($\lambda_{max.}$ = 531 nm)

This mixture dyes polyester fiber material a rubine-red tone and is particularly suitable for rapid dyeing (for example, in the Foron® RD process). The dyeings have good fastness properties.

EXAMPLE 192

Example 191 is repeated replacing 13.5 parts of 3-(N-methyI-N-phenyl-amino)propionic acid 2'-methylphenylester with 13.5 parts of 3-(N-methyI-N-phenylamino)propionic acid-3'-methyl-phenyl ester. The resulting precipitate is a 50:50 mix of the compounds of the formulae below

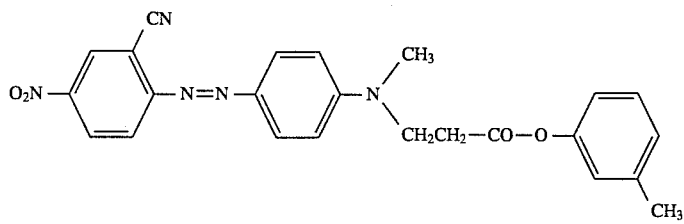

($\lambda_{max.}$ = 531 nm)

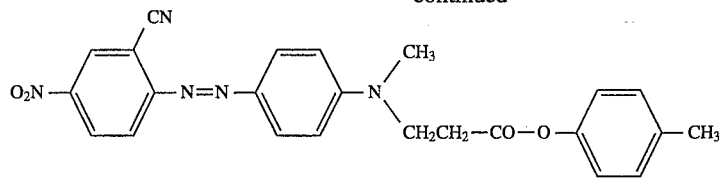
($\lambda_{max.}$ = 531 nm)
This mixture dyes polyester fiber material a rubine-red tone and is particularly useful in rapid dyeing. The resulting dyeings have good fastness properties.
EXAMPLES 193–575
Compound of the formula
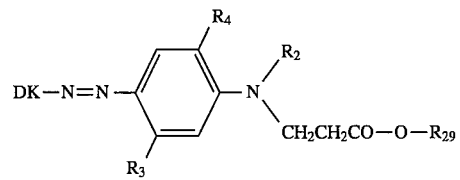
in which the symbols are defined in Table 5 below can be made from known compounds by a method analogous to that of Example 1.

| Ex # | DK | R₂ | R₃ | R₄ | R₂₉ | nuance on polyester |
|---|---|---|---|---|---|---|
| 193 | 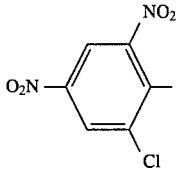 | —CH₂C≡CH | —NHCOCH₃ | OCH₃ | 4-methoxy-carbonyl-phenyl | navy blue |
| 194 | " | " | —NHCOC₂H₅ | " | 4-methoxy-carbonyl-phenyl | " |
| 195 | " | " | " | OCH₂CH₃ | 4-methoxy-carbonyl-phenyl | " |
| 196 | " | " | —NHCOCH₃ | " | 4-ethoxy-carbonyl-phenyl | " |
| 197 | " | " | " | OCH₃ | 4-ethoxy-carbonyl-phenyl | " |
| 198 | " | " | " | " | 3-methoxy-phenyl | " |
| 199 | " | " | " | OC₂H₅ | " | " |
| 200 | " | " | —NHCOC₂H₅ | " | " | " |
| 201 | " | " | " | OCH₃ | " | " |
| 202 | " | " | " | " | 3-methyl-phenyl | " |
| 203 | " | " | " | OC₂H₅ | " | " |
| 204 | " | " | NHCOC₂H₅ | " | " | " |
| 205 | " | " | " | OCH₃ | " | " |
| 206 | " | " | " | OC₂H₄CH₃ | phenyl | " |
| 207 | " | " | " | OC₂H₅ | " | " |
| 208 | " | " | NHCOC₂H₅ | " | " | " |
| 209 | " | " | " | OC₂H₅ | " | " |
| 210 | " | CH₂CH=CH₂ | NHCOCH₃ | OCH₃ | 4-methoxycarbonyl-phenyl | " |
| 211 | " | " | " | OC₂H₅ | 4-methoxycarbonyl-phenyl | " |
| 212 | " | " | NHCOC₂H₅ | " | 4-methoxycarbonyl-phenyl | " |
| 213 | " | " | " | OCH₃ | 4-methoxy-carbonyl-phenyl | " |
| 214 | " | " | " | " | 4-aethoxy-carbonyl phenyl | " |
| 215 | " | " | " | OC₂H₅ | 4-aethoxy-carbonyl-phenyl | " |
| 216 | " | " | NHCOCH₃ | " | 4-aethoxy-carbonyl-phenyl | " |
| 217 | " | " | " | OCH₃ | 4-aethoxy-carbonyl-phenyl | " |
| 218 | " | " | " | " | 3-methoxy-phenyl | " |
| 219 | " | " | " | OC₂H₅ | " | " |
| 220 | " | " | NHCOC₂H₅ | " | " | " |
| 221 | " | " | " | OCH₃ | " | " |
| 222 | " | " | " | " | 3-methyl-phenyl | " |
| 223 | " | " | " | OC₂H₅ | " | " |
| 224 | " | " | NHCOCH₃ | " | " | " |
| 225 | " | " | " | OCH₃ | " | " |
| 226 | " | " | NHCOC₂H₅ | " | phenyl | " |
| 227 | " | " | " | OC₂H₅ | " | " |
| 228 | " | " | NHCOCH₃ | " | " | " |
| 229 | " | CH₂CH=CH—Cl | " | OCH₃ | 4-methoxy-carbonyl-phenyl | " |
| 230 | " | " | " | OC₂H₅ | 4-methoxy-carbonyl-phenyl | " |
| 231 | " | " | NHCOC₂H₅ | " | 4-methoxy-carbonyl-phenyl | " |
| 232 | " | " | " | OCH₃ | 4-methoxy-carbonyl-phenyl | " |
| 233 | " | " | NHCOCH₃ | " | 4-ethoxy-carbonyl-phenyl | " |
| 234 | " | " | " | OC₂H₅ | 4-ethoxy-carbonyl-phenyl | " |
| 235 | " | " | NHCOC₂H₅ | " | 4-ethoxy-carbonyl-phenyl | " |
| 236 | " | " | " | " | 4-ethoxy-carbonyl-phenyl | " |
| 237 | " | " | " | " | 3-methoxy-phenyl | " |
| 238 | " | " | " | OCH₃ | " | " |
| 239 | " | " | NHCOCH₃ | OC₂H₅ | " | " |

-continued

| Ex # | DK | R$_2$ | R$_3$ | R$_4$ | R$_{29}$ | nuance on polyester |
|---|---|---|---|---|---|---|
| 240 | " | " | NHCOCH$_3$ ‖ O | " | " | " |
| 241 | " | " | " | OCH$_3$ | " | " |
| 242 | " | " | " | " | 3-methyl-phenyl | " |
| 243 | " | " | " | OC$_2$H$_5$ | " | " |
| 244 | " | " | NHCOCH$_3$ | " | " | " |
| 245 | " | " | " | OCH$_3$ | " | " |
| 246 | " | " | NHCOC$_2$H$_5$ | " | " | " |
| 247 | " | " | " | OC$_2$H$_5$ | " | " |
| 248 | " | " | " | " | phenyl | " |
| 249 | " | " | " | OCH$_3$ | " | " |
| 250 | " | " | NHCOCH$_3$ | OC$_2$H$_5$ | " | " |
| 251 | " | CH$_2$CH$_2$OCOCH$_3$ | " | " | 4-methoxy-carbonyl-phenyl | " |
| 252 | " | " | " | OCH$_3$ | 4-methoxy-carbonyl-phenyl | " |
| 253 | " | " | NHCOCH$_3$ ‖ O | OC$_2$H$_5$ | 4-methoxy-carbonyl-phenyl | " |
| 254 | " | " | NHCOC$_2$H$_5$ | " | 4-methoxy-carbonyl-phenyl | " |
| 255 | " | " | " | OCH$_3$ | 4-methoxy-carbonyl-phenyl | " |
| 256 | " | " | NHCOCH$_3$ | OC$_2$H$_4$OCH$_3$ | 4-methoxy-carbonyl-phenyl | " |
| 257 | " | CH$_2$CH$_2$OCOCH$_3$ | NHCOCH$_3$ | OCH$_3$ | 3-methoxy-phenyl | " |
| 258 | " | " | " | OC$_2$H$_5$ | " | " |
| 259 | " | " | NHCOC$_2$H$_5$ | " | " | " |
| 260 | " | " | " | " | " | " |
| 261 | " | " | " | " | 3-methyl-phenyl | " |
| 262 | " | " | " | OCH$_3$ | " | " |
| 263 | " | " | NHCOCH$_3$ | " | " | " |
| 264 | " | " | " | OC$_2$H$_5$ | " | " |
| 265 | " | " | " | OC$_2$H$_4$OCH$_3$ | " | " |
| 266 | " | " | " | " | 3-methoxy-phenyl | " |
| 267 | " | " | " | " | phenyl | " |
| 268 | " | " | " | OCH$_3$ | " | " |
| 269 | " | " | " | OC$_2$H$_5$ | " | " |
| 270 | " | " | NHCOC$_2$H$_5$ | " | " | " |
| 271 | " | " | " | OCH$_3$ | " | " |
| 272 | " | CH$_2$CH(CH$_3$)OCOCH$_3$ | " | " | " | " |
| 273 | " | " | " | OC$_2$H$_5$ | " | " |
| 274 | " | " | NHCOCH$_3$ | " | " | " |
| 275 | " | " | " | OCH$_3$ | " | " |
| 276 | " | " | " | " | 3-methoxy-carbonyl-phenyl | " |
| 277 | " | " | " | OC$_2$H$_5$ | 3-methoxy-carbonyl-phenyl | " |
| 278 | " | " | NHCOC$_2$H$_5$ | " | 3-methoxy-carbonyl-phenyl | " |
| 279 | " | " | OCH$_3$ | OCH$_3$ | 3-methoxy-carbonyl-phenyl | " |
| 280 | " | " | " | " | 3-methyl-phenyl | " |
| 281 | " | " | " | OC$_2$H$_5$ | " | " |
| 282 | " | " | —CH$_2$CH(CH$_3$)OCOCH$_3$ | NHCOCH$_3$ | OCH$_3$ | 3-methylphenyl | " |
| 283 | " | " | " | OC$_2$H$_5$ | " | " |
| 284 | " | " | " | " | 4-methoxycarbonyl-phenyl | " |
| 285 | " | " | " | OCH$_3$ | 4-methoxycarbonyl-phenyl | " |
| 286 | " | " | NHCOC$_2$H$_5$ | " | 4-methoxycarbonyl-phenyl | " |
| 287 | " | " | " | OC$_2$H$_5$ | 4-methoxycarbonyl-phenyl | " |
| 288 | " | " | " | " | 4-ethoxycarbonyl-phenyl | " |
| 289 | " | " | " | OCH$_3$ | 4-ethoxycarbonyl-phenyl | " |
| 290 | " | " | NHCOCH$_3$ | " | 4-ethoxycarbonyl-phenyl | " |
| 291 | " | " | " | OC$_2$H$_5$ | 4-ethoxycarbonyl-phenyl | " |
| 292 | " | CH$_2$CH$_2$OCOOCH$_3$ | " | " | 4-ethoxycarbonyl-phenyl | " |

| Ex # | DK | R₂ | R₃ | R₄ | R₂₉ | nuance on polyester |
|---|---|---|---|---|---|---|
| 293 | " | " | " | OCH₃ | 4-ethoxycarbonyl-phenyl | " |
| 294 | " | " | NHCOC₂H₅ | " | 4-ethoxycarbonyl-phenyl | " |
| 295 | " | " | " | OC₂H₅ | 4-ethoxycarbonyl-phenyl | " |
| 296 | " | " | " | " | 4-methoxycarbonyl-phenyl | " |
| 297 | " | " | " | OCH₃ | 4-methoxycarbonyl-phenyl | " |
| 298 | " | " | " | " | 4-methoxycarbonyl-phenyl | " |
| 299 | " | " | " | OC₂H₅ | 4-methoxycarbonyl-phenyl | " |
| 300 | " | " | " | " | 3-methoxyphenyl | " |
| 301 | " | " | " | OCH₃ | " | " |
| 302 | " | " | NHCOCH₃ | " | " | " |
| 303 | " | " | " | OC₂H₅ | " | " |
| 304 | " | " | NHCOOCH₃ | " | " | " |
| 305 | " | " | " | OCH₃ | " | " |
| 306 | " | " | NHCOCH₃ | " | 3-methylphenyl | " |
| 307 | " | " | " | OC₂H₅ | " | " |
| 308 | " | " | NHCOC₂H₅ | " | " | " |
| 309 | " | " | " | OCH₃ | " | " |
| 310 | " | " | NHCOOCH₃ | " | " | " |
| 311 | " | CH₂CH(CH₃)OCOOCH₃ | " | " | " | " |
| 312 | " | " | NHCOCH₃ | " | " | " |
| 313 | " | " | " | OC₂H₅ | " | " |
| 314 | " | " | " | " | 3-methoxyphenyl | " |
| 315 | " | " | " | OCH₃ | " | " |
| 316 | " | " | NHCOOCH₃ | " | " | " |
| 317 | " | " | " | " | 4-methoxycarbonyl-phenyl | " |
| 318 | " | " | " | OC₂H₅ | 4-methoxycarbonyl-phenyl | " |
| 319 | " | " | NHCOCH₃ | " | 4-methoxycarbonyl-phenyl | " |
| 320 | " | " | " | OCH₃ | 4-methoxycarbonyl-phenyl | " |
| 321 | " | " | " | " | 4-ethoxycarbonyl-phenyl | " |
| 322 | " | " | " | OC₂H₅ | 4-ethoxycarbonyl-phenyl | " |
| 323 | " | " | " | OC₂H₄OCH₃ | 4-ethoxycarbonyl-phenyl | " |
| 324 | " | CH₂C≡CH | " | OCH₃ | 4-hydroxyphenyl | " |
| 325 | " | CH₂CH=CH₂ | " | " | " | " |
| 326 | " | CH₂CH=CH—Cl | " | " | " | " |
| 327 | " | CH₂CH=CH₂ | NHCOC₂H₅ | " | " | " |
| 328 | 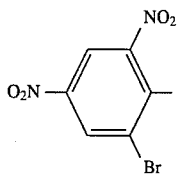 | —CH₂C≡CH | NHCOCH₃ | OCH₃ | 4-methoxycarbonyl-phenyl | " |
| 329 | " | " | NHCOC₂H₅ | " | 4-methoxycarbonyl-phenyl | " |
| 330 | " | " | " | OCH₂CH₃ | 4-methoxycarbonyl-phenyl | " |
| 331 | " | " | NHCOCH₃ | " | 4-ethoxycarbonyl-phenyl | " |
| 332 | " | " | " | OCH₃ | 4-ethoxycarbonyl-phenyl | " |
| 333 | " | " | " | " | 3-methoxyphenyl | " |
| 334 | " | " | " | OC₂H₅ | " | " |
| 335 | " | " | NHCOC₂H₂ | " | " | " |
| 336 | " | " | " | OCH₃ | " | " |
| 337 | " | " | " | " | 3-methylphenyl | " |
| 338 | " | " | " | OC₂H₅ | " | " |
| 339 | " | " | NHCOCH₃ | " | " | " |

-continued

| Ex # | DK | R₂ | R₃ | R₄ | R₂₉ | nuance on polyester |
|---|---|---|---|---|---|---|
| 340 | " | " | " | OCH₃ | " | " |
| 341 | " | " | " | OC₂H₄.CH₃ | phenyl | " |
| 342 | " | " | " | OC₂H₅ | " | " |
| 343 | " | " | NHCOC₂H₅ | " | " | " |
| 344 | " | " | " | " | " | " |
| 345 | " | —CH₂CH=CH₂ | NHCOCH₃ | OCH₃ | 4-methoxycarbonyl-phenyl | navy blue |
| 346 | " | " | " | OC₂H₅ | 4-methoxycarbonyl-phenyl | " |
| 347 | " | " | NHCOC₂H₅ | " | 4-methoxycarbonyl-phenyl | " |
| 348 | " | " | " | OCH₃ | 4-methoxycarbonyl-phenyl | " |
| 349 | " | " | " | " | 4-ethoxycarbonyl-phenyl | " |
| 350 | " | " | " | OC₂H₅ | 4-ethoxycarbonyl-phenyl | " |
| 351 | " | " | NHCOCH₃ | " | 4-ethoxycarbonyl-phenyl | " |
| 352 | " | " | " | OCH₃ | 4-ethoxycarbonyl-phenyl | " |
| 353 | " | " | " | " | 3-methoxyphenyl | " |
| 354 | " | " | " | OC₂H₅ | " | " |
| 355 | " | " | NHCOC₂H₅ | " | " | " |
| 356 | " | " | " | OCH₃ | " | " |
| 357 | " | " | " | " | 3-methylphenyl | " |
| 358 | " | " | " | OC₂H₅ | " | " |
| 359 | " | " | NHCOCH₃ | " | " | " |
| 360 | " | " | " | OCH₃ | " | " |
| 361 | " | " | NHCOC₂H₅ | " | phenyl | " |
| 362 | " | " | " | OC₂H₅ | " | " |
| 363 | " | " | NHCOCH₃ | " | " | " |
| 364 | " | CH₂CH=CH—Cl | " | OCH₃ | 4-methoxycarbonyl-phenyl | " |
| 365 | " | " | " | OC₂H₅ | 4-methxoycarbonyl-phenyl | " |
| 366 | " | " | NHCOC₂H₅ | " | 4-methoxycarbonyl-phenyl | " |
| 367 | " | " | " | OCH₃ | 4-methoxycarbonyl-phenyl | " |
| 368 | " | CH₂CH=CH—Cl | NHCOCH₃ | OCH₃ | 4-ethoxycarbonyl-phenyl | " |
| 369 | " | " | " | OC₂H₅ | 4-ethoxycarbonyl-phenyl | " |
| 370 | " | " | NHCOC₂H₅ | " | 4-ethoxycarbonyl-phenyl | " |
| 371 | " | " | " | OC₂H₅ | 4-ethoxycarbonyl-phenyl | " |
| 372 | " | " | " | " | 3-methoxyphenyl | " |
| 373 | " | " | " | OCH₃ | " | " |
| 374 | " | " | NHCOCH₃ | OC₂H₅ | " | " |
| 375 | " | " | NHCOOCH₃ | " | " | " |
| 376 | " | " | " | OCH₃ | " | " |
| 377 | " | CH₂CH=CH—Cl | " | " | 3-methylphenyl | " |
| 378 | " | " | " | OC₂H₅ | " | " |
| 379 | " | " | NHCOCH₃ | " | " | " |
| 380 | " | " | " | OCH₃ | " | " |
| 381 | " | " | NHCOC₂H₅ | " | " | " |
| 382 | " | " | " | OC₂H₅ | " | " |
| 383 | " | " | " | " | phenyl | " |
| 384 | " | " | " | OCH₃ | " | " |
| 385 | " | " | NHCOCH₃ | OC₂H₅ | " | " |
| 386 | " | CH₂CH₂OCOCH₃ | " | " | 4-methoxycarbonyl-phenyl | " |
| 387 | " | " | " | OCH₃ | 4-methoxycarbonyl-phenyl | " |
| 388 | " | " | NHCOOCH₃ | OC₂H₅ | 4-methoxycarbonyl-phenyl | " |
| 389 | " | " | NHCOC₂H₅ | " | 4-methoxycarbonyl-phenyl | " |
| 390 | " | " | " | OCH₃ | 4-methoxycarbonyl-phenyl | " |
| 391 | " | " | NHCOCH₃ | OC₂H₄OCH₃ | 4-methoxycarbonyl-phenyl | " |
| 392 | " | " | NHCOCH₃ | OCH₃ | 3-methoxyphenyl | " |
| 393 | " | " | " | OC₂H₅ | " | " |
| 394 | " | " | NHCOCH₃ | " | " | " |

-continued

| Ex # | DK | R₂ | R₃ | R₄ | R₂₉ | nuance on polyester |
|---|---|---|---|---|---|---|
| 395 | " | " | " | " | " | " |
| 396 | " | " | " | " | 3-methylphenyl | " |
| 397 | " | " | " | OCH₃ | " | " |
| 398 | " | " | NHCOCH₃ | " | " | " |
| 399 | " | " | " | OC₂H₅ | " | " |
| 400 | " | " | " | OC₂H₄OCH₃ | " | " |
| 401 | " | " | " | " | 3-methoxyphenyl | " |
| 402 | " | " | " | " | phenyl | " |
| 403 | " | " | " | OCH₃ | " | " |
| 404 | " | " | NHCOOCH₃ | OC₂H₅ | " | " |
| 405 | " | " | NHCOC₂H₅ | " | " | " |
| 406 | " | " | " | OCH₃ | " | " |
| 407 | " | CH₂CH(CH₃)OCOCH₃ | " | " | " | " |
| 408 | " | " | " | OC₂H₅ | " | " |
| 409 | " | " | NHCOCH₃ | " | " | " |
| 410 | " | " | " | OCH₃ | " | " |
| 411 | " | " | " | " | 3-methoxycarbonyl-phenyl | " |
| 412 | " | " | " | OC₂H₅ | 3-methoxycarbonyl-phenyl | " |
| 413 | " | " | NHCOC₂H₅ | " | 3-methoxycarbonyl-phenyl | " |
| 414 | " | " | " | OCH₃ | 3-methoxycarbonyl-phenyl | " |
| 415 | " | " | " | " | 3-methylphenyl | " |
| 416 | " | " | " | OC₂H₅ | " | " |
| 417 | " | CH₂CH(CH₃)OCOCH₃ | NHCOCH₃ | OCH₃ | 3-methylphenyl | " |
| 418 | " | " | " | OC₂H₅ | " | " |
| 419 | " | " | " | " | 4-methoxycarbonyl-phenyl | " |
| 420 | " | " | " | OCH₃ | 4-methoxycarbonyl-phenyl | " |
| 421 | " | " | NHCOC₂H₅ | " | 4-methoxycarbonyl-phenyl | " |
| 422 | " | " | " | OC₂H₅ | 4-methoxycarbonyl-phenyl | " |
| 423 | " | " | " | " | 4-ethoxycarbonyl-phenyl | " |
| 424 | " | " | " | OCH₃ | 4-ethoxycarbonyl-phenyl | " |
| 425 | " | " | NHCOCH₃ | " | 4-ethoxycarbonyl-phenyl | " |
| 426 | " | " | " | OC₂H₅ | 4-ethoxycarbonyl-phenyl | " |
| 427 | " | CH₂CH₂OCOOCH₃ | " | " | 4-ethoxycarbonyl-phenyl | " |
| 428 | " | " | " | OCH₃ | 4-ethoxycarbonyl-phenyl | " |
| 429 | " | " | NHCOC₂H₅ | " | 4-ethoxycarbonyl-phenyl | " |
| 430 | " | " | " | OC₂H₅ | 4-ethoxycarbonyl-phenyl | " |
| 431 | " | " | " | " | 4-methoxycarbonyl-phenyl | " |
| 432 | " | " | " | OCH₃ | 4-methoxycarbonyl-phenyl | " |
| 433 | " | " | " | " | 4-methoxycarbonyl-phenyl | " |
| 434 | " | " | " | OC₂H₅ | 4-methoxycarbonyl-phenyl | " |
| 435 | " | " | " | " | 3-methoxyphenyl | " |
| 436 | " | " | " | OCH₃ | " | " |
| 437 | " | " | NHCOCH₃ | " | " | " |
| 438 | " | " | " | OC₂H₅ | " | " |
| 439 | " | " | NHCOOCH₃ | " | " | " |
| 440 | " | " | " | OCH₃ | " | " |
| 441 | " | CH₂CH₂OCOOCH₃ | NHCOCH₃ | " | 3-methylphenyl | " |
| 442 | " | " | " | OC₂H₅ | " | " |
| 443 | " | " | NHCOC₂H₅ | " | " | " |
| 444 | " | " | " | OCH₃ | " | " |
| 445 | " | " | NHCOOCH₃ | " | " | " |
| 446 | " | CH₂CH(CH₃)OCOOCH₃ | " | " | " | " |
| 447 | " | " | NHCOCH₃ | " | " | " |
| 448 | " | " | " | OC₂H₅ | " | " |
| 449 | " | " | " | " | 3-methoxyphenyl | " |
| 450 | " | " | " | OCH₃ | " | " |
| 451 | " | " | NHCOOCH₃ | " | " | " |

| Ex # | DK | R₂ | R₃ | R₄ | R₂₉ | nuance on polyester |
|---|---|---|---|---|---|---|
| 452 | " | " | " | " | 4-methoxycarbonyl-phenyl | " |
| 453 | " | " | " | OC₂H₅ | 4-methoxycarbonyl-phenyl | " |
| 454 | " | " | NHCOCH₃ | " | 4-methoxycarbonyl-phenyl | " |
| 455 | " | " | " | OCH₃ | 4-methoxycarbonyl-phenyl | " |
| 456 | " | " | " | " | 4-ethoxycarbonyl-phenyl | " |
| 457 | " | " | " | OC₂H₅ | 4-ethoxycarbonyl-phenyl | " |
| 458 | " | " | " | OC₂H₄OCH₃ | 4-ethoxycarbonyl-phenyl | " |
| 459 | " | CH₂C≡CH | " | OCH₃ | 4-hydroxyphenyl | " |
| 460 | " | CH₂CH=CH₂ | " | " | " | " |
| 461 | " | CH₂CH=CH—Cl | " | " | " | " |
| 462 | " | CH₂CH=CH₂ | NHCOC₂H₅ | " | " | " |
| 463 | " | 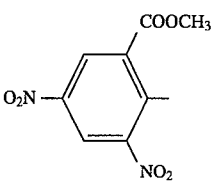 | NHCOCH₃ | " | 4-oxycarbonyphenyl | " |
| 464 | " | " | " | " | 3-methoxyphenyl | " |
| 465 | " | 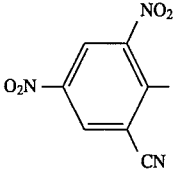—CH₂CH₂— | NHCOCH₃ | H | phenyl | " |
| 466 | " | " | NHCOC₂H₅ | H | " | " |
| 467 | " | —CH(CH₃)CH₃ | " | H | " | " |
| 468 | " | " | NHCOCH₃ | H | " | " |
| 469 | " | —CHCH₂CH₃<br>\|<br>CH₃ | " | H | " | " |
| 470 | " | " | NHCOC₂H₅ | H | " | " |
| 471 | " | CH(CH₃)C₄H₉-n | NHCOCH₃ | H | " | " |
| 472 | " | " | " | H | 3-methoxyphenyl | " |
| 473 | " | CHCH₃ | " | H | " | " |
| 474 | " | " | NHCOC₂H₅ | H | " | " |
| 475 | " | —CH₂CH₂CH₂C₆H₅ | " | H | " | " |
| 476 | " | " | NHCOCH₃ | H | " | " |
| 477 | " | " | " | H | 3-methylphenyl | " |
| 478 | " | " | NHCOC₂H₅ | H | " | " |
| 479 | " | —CH₂CH₃ | " | H | " | " |
| 480 | " | —CHCH₃<br>\|<br>CH₃ | " | H | " | " |
| 481 | " | CH₂CH₂CH₃ | NHCOCH₃ | H | " | " |
| 482 | " | " | " | H | 3-methoxyphenyl | " |
| 483 | " | CH₂CH₃ | " | H | 4-methoxyphenyl | " |
| 484 | " | " | " | H | 4-methoxycarbonyl-phenyl | " |
| 485 | " | " | NHCOCH₂CH₃ | H | 4-methoxycarbonyl-phenyl | " |
| 486 | " | —CHCH₂CH₃<br>\|<br>CH₃ | NHCOCH₃ | H | 4-methoxycarbonyl-phenyl | " |
| 487 | " | CH₂CH₃ | " | H | 4-ethoxycarbonyl- | " |

-continued

| Ex # | DK | R₂ | R₃ | R₄ | R₂₉ | nuance on polyester |
|---|---|---|---|---|---|---|
| 488 | " | " | NHCOC₂H₅ | H | 4-ethoxycarbonyl-phenyl | " |
| 489 | " | CH₂CH=CH₂ | NHCOCH₃ | H | phenyl | " |
| 490 | " | " | " | H | 4-methoxycarbonyl-phenyl | " |
| 491 | " | " | NHCOC₂H₅ | H | 4-methoxycarbonyl-phenyl | " |
| 492 | " | " | " | H | 3-methoxyphenyl | " |
| 493 | " | " | NHCOCH₃ | H | " | " |
| 494 | " | " | " | H | 3-methylphenyl | " |
| 495 | " | " | NHCOC₂H₅ | H | " | " |
| 496 | " | " | NHCOCH₃ | H | 4-methoxyphenyl | " |
| 497 | " | CH₂C≡CH | " | H | 3-methoxyphenyl | bluish violet |
| 498 | " | " | " | H | phenyl | bluish violet |
| 499 | " | " | NHCOOCH₃ | H | " | bluish violet |
| 500 | " | " | NHCOC₂H₅ | H | " | bluish violet |
| 501 | " | CH₂CH₂COOCH₃ | NHCOCH₃ | H | 3-methyoxyphenyl | bluish violet |
| 502 | " | " | " | H | 3-methylphenyl | bluish violet |
| 503 | " | CH₂CH₂COOCH₃ | " | H | " | bluish violet |
| 504 | " | " | " | H | 3-methoxyphenyl | bluish violet |
| 505 | " | CH₂CH₂COOCH₂CH₃ | " | H | " | bluish violet |
| 506 | " | " | " | H | 4-methoxycarbonyl-phenyl | bluish violet |
| 507 | " | —CH₂C₆H₅ | " | H | 4-methoxycarbonyl-phenyl | bluish violet |
| 508 | " | " | " | H | 3-methoxyphenyl | bluish violet |
| 509 | " | —CH₂—CH₂C₆H₅ | " | H | " | bluish violet |
| 510 | " | " | " | H | phenyl | bluish violet |
| 511 | " | " | NHCOC₂H₅ | H | " | bluish violet |
| 512 | " | CH₂CH=CH—Cl | NHCOCH₃ | H | 4-methoxycarbonyl-phenyl | bluish violet |
| 513 | " | " | " | H | 3-methoxyphenyl | bluish violet |
| 514 | " | —CH₂CH₂CH₂C₆H₅ | " | H | phenyl | bluish violet |
| 515 | " | " | " | H | " | bluish violet |
| 516 | " | CH₂CH₃ | " | H | " | bluish violet |
| 517 | " | " | " | H | 4-methxoycarbonyl-phenyl | bluish violet |
| 518 | " | " | NHCOC₂H₅ | H | 4-methoxycarbonyl-phenyl | bluish violet |
| 519 | " | —CHCH₂CH₂CH₂CH₃<br>\|<br>CH₃ | NHCOCH₃ | H | 4-methoxycarbonyl-phenyl | bluish violet |
| 520 | " | " | " | H | 3-methoxyphenyl | bluish violet |
| 521 | " | CH₂CH₃ | " | H | " | bluish violet |
| 522 | " | " | NHCOOCH₃ | H | " | bluish violet |
| 523 | " | " | NHCOCH=CH₂ | H | " | bluish violet |
| 524 | " | " | " | H | phenyl | bluish violet |
| 525 | " | " | " | H | 4-methoxycarbonyl-phenyl | bluish violet |
| 526 | " | " | NHCOCH₂OCH₃ | H | 4-methoxycarbonyl- | bluish |

-continued

| Ex # | DK | R₂ | R₃ | R₄ | R₂₉ | nuance on polyester |
|---|---|---|---|---|---|---|
| 527 | " | " | " | H | phenyl | violet |
| 528 | " | " | " | H | phenyl | bluish violet |
| 529 | " | " | " | H | 3-methoxyphenyl | bluish violet |
| 530 | " | " | " | H | 4-methoxyphenyl | bluish violet |
| 531 | " | " | " | H | 4-ethoxyphenyl | bluish violet |
| 532 | " | " | " | H | " | bluish violet |
| 533 | " | " | " | H | 3-methoxyphenyl | bluish violet |
| 534 | " | —CH₂CH₃ | NHCOCH=CH₂ | H | phenyl | bluish violet |
| 535 | " | " | " | H | " | bluish violet |
| 536 | " | " | " | H | 4-methoxycarbonyl-phenyl | bluish violet |
| 537 | " | " | " | H | 3-methoxyphenyl | bluish violet |
| 538 | " | " | —NHCOCH₃ | H | " | bluish violet |
| 539 | " | " | " | H | 4-methylphenyl | bluish violet |
| 540 | " | " | " | H | 2-methylphenyl | bluish violet |
| 541 | " | CH₂C≡CH | " | H | 2-methoxyphenyl | bluish violet |
| 542 | " | CH₂CH=CH₂ | " | H | " | bluish violet |
| 543 | " | CH₂CH=CH—Cl | " | H | " | bluish violet |
| 544 | " | " | " | H | " | bluish violet |
| 545 | " | CH₂C≡CH | " | H | 2-methylphenyl | bluish violet |
| 546 | " | CH₂CH=CH₂ | " | H | " | bluish violet |
| 547 | " | " | " | H | " | bluish violet |
| 548 | " | " | NH—C—CH=CH₂<br>∥<br>O | H | 2-methoxyphenyl | bluish violet |
| 549 | " | CH₂C≡CH | " | H | 4-methoxycarbonyl-phenyl | bluish violet |
| 550 | " | " | O<br>∥<br>NHCCH₂OCH₃ | H | 4-methoxycarbonyl-phenyl | bluish violet |
| 551 | O₂N—⟨phenyl with NO₂ and Cl⟩ | " | " | H | 4-methoxycarbonyl-phenyl | bluish violet |
| 552 | O₂N—⟨phenyl with 2 Cl⟩ | CH₃ | H | H | 4-ethoxycarbonyl-phenyl | bluish violet |

| Ex # | DK | R₂ | R₃ | R₄ | R₂₉ | nuance on polyester |
|---|---|---|---|---|---|---|
| 553 | 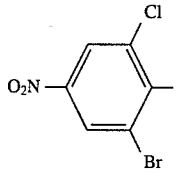 | CH₃ | H | H | 4-ethoxycarbonyl-phenyl | bluish violet |
| 554 | 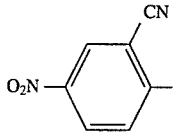 | CH₃ | H | H | 4-ethoxycarbonyl-phenyl | bluish violet |
| 555 | 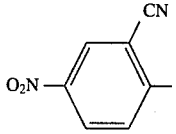 | CH₂C≡CH | NHCOCH₃ | H | 3-methoxyphenyl | bluish violet |
| 556 | 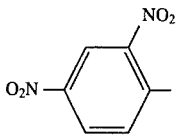 | " | " | H | " | bluish violet |
| 557 | " | CH₂C≡CH | NHCOCH=CH₂ | H | 4-methoxycarbonyl-phenyl | bluish violet |
| 558 | 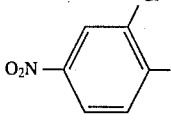 | " | NHSO₂CH₃ | H | 4-methoxycarbonyl-phenyl | bluish violet |
| 559 | 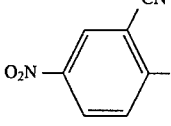 | CH₂C≡CH | " | H | 4-methoxycarbonyl-phenyl | bluish violet |
| 560 | 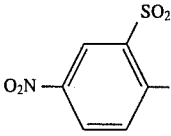 | CH₂CH₃ | H | H | 3-ethoxycarbonyl-phenyl | reddish violet |
| 561 | 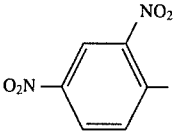 | CH₂CH₂COCH₃ | NHCOCH₃ | H | 4-methoxycarbonyl-phenyl | reddish-violet |
| 562 | " | CH₂CH₂COOCH₂CH₃ | " | H | 4-methoxycarbonyl-phenyl | reddish-violet |
| 563 | 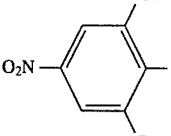 | CH₂CH₃ | " | H | phenyl | reddish-blue |

| Ex # | DK | $R_2$ | $R_3$ | $R_4$ | $R_{29}$ | nuance on polyester |
|---|---|---|---|---|---|---|
| 564 | 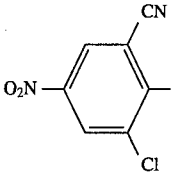 (O₂N-, CN, Cl substituted phenyl) | " | " | H | " | reddish-blue |
| 565 | " | CHC₄H₉ | " | H | " | blue |
| 566 | " | " | " | H | 3-methoxyphenyl | " |
| 567 | 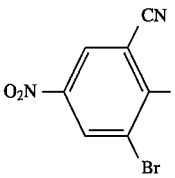 (O₂N-, CN, Br substituted phenyl) | " | " | H | " | " |
| 568 | " | CH₂CH₃ | NHCOCH₂CH₃ | H | " | " |
| 569 | 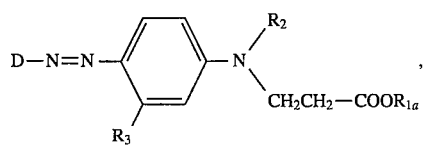 (O₂N-, CN substituted phenyl) | CH₂CH₂OCOCH₃ | H | H | 4-methoxycarbonyl-phenyl | bluish red |
| 570 | " | CH₂CH₂OCOCH₂CH₃ | H | H | 4-methoxycarbonyl-phenyl | " |
| 571 | " | CH₂CH₂OCOOCH₃ | H | H | 4-methoxycarbonyl-phenyl | " |
| 572 | " | CH₂CH(CH₃)COOCH₃ | H | H | 4-methoxycarbonyl-phenyl | " |
| 573 | " | CH₂CH(CH₃)COOCH₃ | H | H | 4-methoxycarbonyl-phenyl | " |
| 574 | " | " | H | H | 4-ethoxycarbonyl-phenyl | " |
| 575 | " | CH₂C≡CH | H | H | 4-ethoxycarbonyl-phenyl | " |

Application Example 20 parts of the dyestuff of Example 1 in the form of a wet presscake are wet milled with 80 parts of a commercially available dispersing ligninsulphonate dispersing agent and then are dried to a powder.

3.0 parts of the resulting dyeing preparation are added to 2000 parts of demineralized water at 70° C., containing 40 parts of ammonium sulphate to form a dyebath in a dyeing machine. With an 85% aqueous formic acid solution, the pH is brought to 5.

100 parts of a precleaned polyester fiber material is added to the dyebath, the dyeing apparatus is closed, and the bath is heated to 130° C. over 20 minutes. Dyeing is carded out at this temperature for a further 40 minutes. After cooling, the polyester fiber material is removed from the bath, washed, soaped and reductively cleaned with sodium hydrosulphite.

A clear brilliant rubine-red dyeing having good thermomigration, wash fastness, rubbing fastness, light fastness and sublimation fastness properties results.

The Application Example can be repeated using 20 parts of the dyestuff of any one of Examples 2–575 in place of that of Example 1.

What is claimed is:

1. A compound of the formula $$D-N=N-\underset{R_3}{\underset{|}{\bigcirc}}-N\underset{CH_2CH_2-COOR_{1a}}{\overset{R_2}{\diagup}},$$

wherein
D is

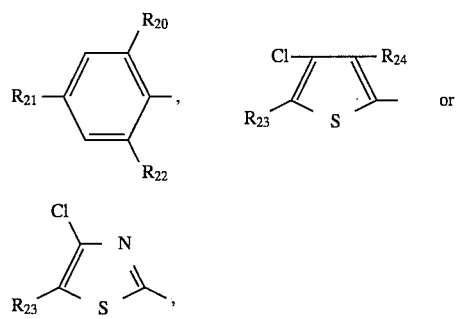

wherein
$R_{20}$ is hydrogen, $C_{1-4}$alkyl, halo, $(C_{1-4}$alkoxy)carbonyl, cyano or nitro, $R_{21}$ is halo, $C_{1-4}$alkyl, nitro, phenylazo or phenylazo the phenyl group of which is substituted by 1 to 4 substituents each of which is independently $C_{1-4}$alkyl, nitro, halo or $C_{1-4}$alkoxy, $R_{22}$ is hydrogen, halo, cyano or ($C_{1-4}$alkoxy)carbonyl, $R_{23}$ is formyl, cyano, —CH=N—O—$C_{1-4}$alkyl or —CH=C(CN)$R_{25a}$, wherein $R_{25a}$ is cyano or ($C_{1-4}$alkoxy)carbonyl, and $R_{24}$ is ($C_{1-4}$alkoxy)carbonyl, nitro or cyano, $R_{1a}$ is phenyl or phenyl substituted by 1 to 4 substituents each of which is independently halo, $C_{1-4}$alkyl, $C_{1-4}$alkoxy, trifluoromethyl, hydroxy, nitro, formyl, cyano, —SCN, ($C_{1-4}$alkyl)carbonyl, ($C_{1-4}$alkyl)carbonylamino, ($C_{1-4}$alkoxy)carbonyl, ($C_{1-4}$alkyl)carbonyloxy, carbamoyl, ($C_{1-2}$alkoxy)($C_{2-3}$alkoxy)carbonyl or phenyl, $R_2$ is hydrogen, $C_{1-6}$alkyl, $C_{2-6}$alkenyl, halo($C_{2-6}$alkenyl), $C_{3-8}$alkynyl, benzyl, phenylethyl, phenylpropyl, hydroxy($C_{1-6}$alkyl), ($C_{1-4}$alkoxy)$C_{1-4}$alkyl, ($C_{1-4}$alkoxy)carbonyl($C_{1-4}$alkyl), ($C_{1-4}$alkyl)carbonyloxy($C_{1-4}$alkyl) or ($C_{1-4}$alkyl)carbonyloxy($C_{1-4}$alkyl), with the proviso that $R_2$ may be hydrogen only when D is a heterocyclic group, 2,4-dinitrophenyl or 2,4-dinitrophenyl having a substituent in the 6-position, and $R_3$ is hydrogen or $C_{1-4}$alkyl, wherein each halo is independently fluoro, chloro, bromo or iodo.

2. A compound according to claim 1 wherein $R_{21}$ is halo, $C_{1-4}$alkyl, nitro or phenylazo.

3. A compound according to claim 2 wherein D is 2-cyano-4-nitrophenyl, 2,4-dinitro-6-bromophenyl, 2,6-dichloro-4-nitrophenyl or 2,4-dinitro-6-chlorophenyl.

4. A compound according to claim 2 wherein $R_{1a}$ is

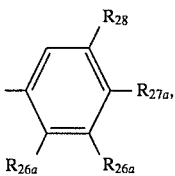

wherein each $R_{26a}$ is independently hydrogen, fluoro, chloro, ($C_{1-2}$alkoxy)carbonyl, methyl, methoxy or ethoxy, $R_{27a}$ is hydrogen, fluoro, chloro, bromo, methyl, methoxy, ethoxy, ($C_{1-2}$alkoxy)carbonyl or phenyl, and $R_{28}$ is hydrogen, methyl, methoxy or ethoxy, $R_2$ is methyl, ethyl, allyl, 2-methylallyl, chloroallyl, propynyl, ($C_{1-2}$alkyl)carbonyloxyethyl or ($C_{1-2}$alkoxy)carbonyloxyethyl, and $R_3$ is hydrogen or methyl.

5. A compound according to claim 4 wherein at least one $R_{26a}$, $R_{27a}$ or $R_{28}$ is hydrogen.

6. A compound according to claim 5 wherein at least two of the $R_{26a}$'s, $R_{27a}$ and $R_{28}$ are hydrogen.

7. A compound according to claim 6 wherein D is 2-cyano-4-nitrophenyl, 2,4-dinitro-6-bromophenyl, 2,6-dichloro-4-nitrophenyl or 2,4-dinitro-6-chlorophenyl.

8. A compound according to claim 1 wherein $R_{1a}$ is

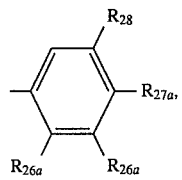

wherein each $R_{26a}$ is independently hydrogen, fluoro, chloro, ($C_{1-2}$alkoxy)carbonyl, methyl, methoxy or ethoxy, $R_{27a}$ is hydrogen, fluoro, chloro, bromo, methyl, methoxy, ethoxy, ($C_{1-2}$alkoxy)carbonyl or phenyl, and $R_{28}$ is hydrogen, methyl, methoxy or ethoxy.

9. A compound according to claim 8 wherein at least one $R_{26a}$, $R_{27a}$ or $R_{28}$ is hydrogen.

10. A compound according to claim 9 wherein at least two of the $R_{26a}$', $R_{27a}$ and $R_{28}$ are hydrogen.

11. A compound according to claim 1 wherein $R_2$ is methyl, ethyl, allyl, 2-methylallyl, chloroallyl, propynyl, ($C_{1-2}$alkyl)carbonyloxyethyl or ($C_{1-2}$alkoxy)carbonyloxyethyl.

12. A compound according to claim 1 wherein $R_3$ is hydrogen or methyl.

13. A compound according to claim 1 having the formula

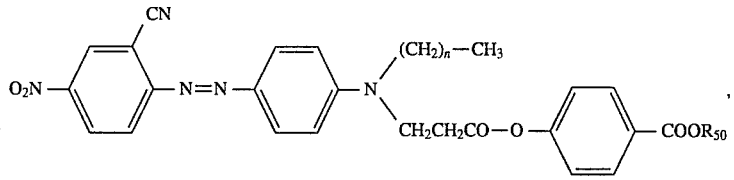

wherein $R_{50}$ is $C_{1-4}$alkyl, and n is 0 or 1.

14. The compound according to claim 13 having the formula

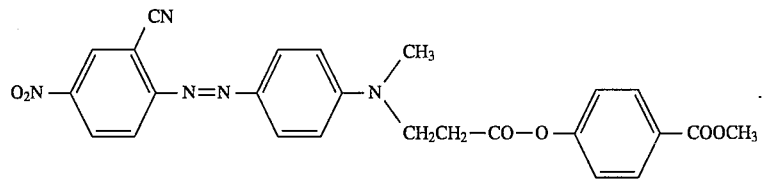
15. The compound according to claim 13 having the formula
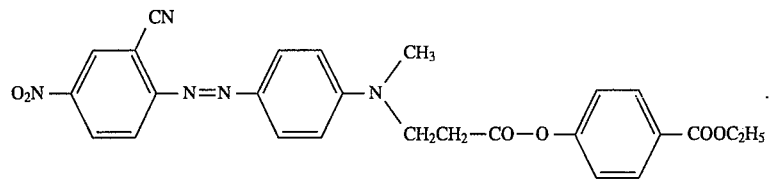
16. A compound according to claim 1 having the formula
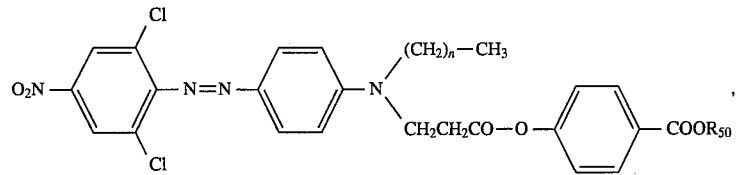
wherein
$R_{50}$ is $C_{1-4}$alkyl, and
n is 0 or 1.
17. The compound according to claim 16 having the formula
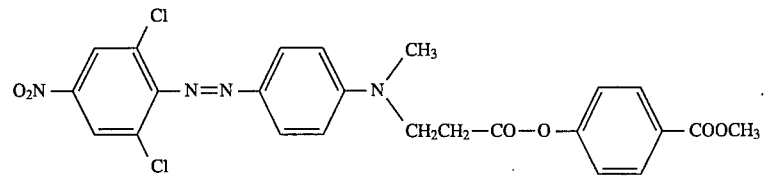
18. The compound according to claim 13 having the formula
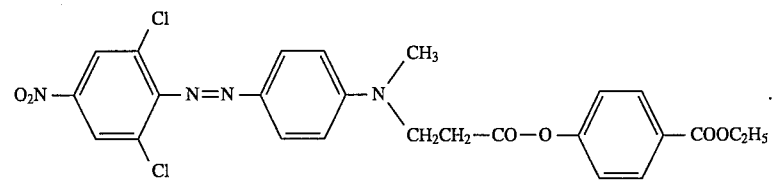
19. A compound according to claim 1 having the formula

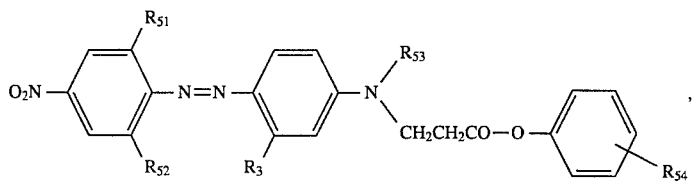

wherein
- $R_3$ is hydrogen or $C_{1-4}$alkyl,
- $R_{51}$ is nitro or cyano,
- $R_{52}$ is chloro, bromo or cyano,
- $R_{53}$ is $C_{1-6}$alkyl, $C_{2-6}$alkenyl, halo($C_{2-6}$alkenyl), $C_{3-8}$alkynyl, benzyl, phenylethyl, phenylpropyl, hydroxy($C_{1-6}$alkyl), ($C_{1-4}$alkoxy)$C_{1-4}$alkyl, ($C_{1-4}$alkoxy)carbonyl($C_{1-4}$ alkyl), ($C_{1-4}$alkyl)carbonyloxy($C_{1-4}$alkyl) or ($C_{1-4}$alkoxy)carbonyloxy($C_{1-4}$alkyl), and
- $R_{54}$ is $C_{1-4}$alkyl, $C_{1-4}$alkoxy, ($C_{1-4}$alkoxy)carbonyl or ($C_{1-4}$alkyl)carbonyl.

20. The compound according to claim 1 having the formula

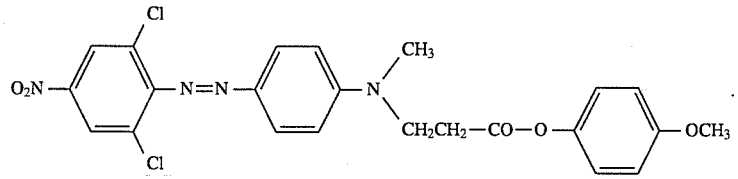

21. A substrate to which a compound according to claim 1 was applied.

22. A substrate according to claim 21 which is a textile material comprising natural, semi-synthetic or fully synthetic hydrophobic, high molecular weight organic material.

* * * * *